United States Patent
Li et al.

(10) Patent No.: US 12,254,574 B2
(45) Date of Patent: Mar. 18, 2025

(54) SYSTEMS AND METHODS FOR FACILITATING NAVIGATION IN SPACE

(71) Applicant: George Mason University, Fairfax, VA (US)

(72) Inventors: Changyang Li, Herndon, VA (US); Lap Fai Yu, McLean, VA (US)

(73) Assignee: GEORGE MASON UNIVERSITY, Fairfax, VA (US)

( * ) Notice: Subject to any disclaimer, the term of this patent is extended or adjusted under 35 U.S.C. 154(b) by 0 days.

(21) Appl. No.: 18/103,543

(22) Filed: Jan. 31, 2023

(65) Prior Publication Data

US 2023/0343035 A1  Oct. 26, 2023

Related U.S. Application Data

(60) Provisional application No. 63/345,546, filed on May 25, 2022, provisional application No. 63/333,681, filed on Apr. 22, 2022.

(51) Int. Cl.
  *G06T 19/00* (2011.01)
  *G06T 3/4038* (2024.01)
  *G06F 3/01* (2006.01)

(52) U.S. Cl.
  CPC .......... *G06T 19/003* (2013.01); *G06T 3/4038* (2013.01); *G06T 19/006* (2013.01); *G06F 3/011* (2013.01); *G06F 2203/012* (2013.01)

(58) Field of Classification Search
  None
  See application file for complete search history.

(56) References Cited

U.S. PATENT DOCUMENTS

2022/0392084 A1* 12/2022 Mohareri ............... G06T 7/215

FOREIGN PATENT DOCUMENTS

WO  WO-9742601 A1 * 11/1997  .......... G11B 27/034

OTHER PUBLICATIONS

Felinto et al., "Production framework for full panoramic scenes with photorealistic augmented reality" 2012 XXXVIII Conferencia Latinoamericana En Informatica (CLEI), pp. 1-10. (Year: 2012).*
Rhee et al., "AugmentedVirtualTeleportationforHigh-FidelityTelecollaboration" IEEE Transactions On Visualization and Computer Graphics, vol. 26, No. 5, May 2020, pp. 1923-1933. (Year: 2020).*
Jiwan Bhandari, et al., "Teleportation without Spatial Disorientation Using Optical Flow Cues", Graphics Interface Conference, pp. 1-6, May 8-11, 2018.
Evren Bozgeyikli, et al., "Point & Teleport Locomotion Technique for Virtual Reality", CHI Play, pp. 1-12, Oct. 16-19, 2016.
Markus Funk, et al., "Assessing the Accuracy of Point & Teleport Locomotion with Orientation Indication for Virtual Reality using Curved Trajectories", CHI, pp. 1-12, May 4-9, 2019.

* cited by examiner

*Primary Examiner* — Amelia L Tapp
(74) *Attorney, Agent, or Firm* — George Likourezos; Carter, DeLuca & Farrell LLP

(57) ABSTRACT

A navigation system for facilitating navigation in a space includes a network interface configured to access a representation of a space, a memory storing instructions, and at least one processor coupled with the memory. The at least one processor executes the instructions to detect objects in the representation of the space and determine a plurality of desirable positions which facilitate navigation in the representation of the space based on the detected objects.

17 Claims, 18 Drawing Sheets

(b) No SP Score Cost (c) No Connectivity Cost (d) No Area Coverage Cost (e) No Room Coverage Cost (f) No Redundant Coverage Cost

SYSTEMS AND METHODS FOR FACILITATING NAVIGATION IN SPACE

GOVERNMENT SUPPORT

This invention was made with government support under grant number 1942531 awarded by the National Science Foundation. The government has certain rights in the invention.

CROSS-REFERENCE TO RELATED APPLICATIONS

This application is related to U.S. Provisional Patent Application No. 63/333,681 filed Apr. 22, 2022 and U.S. Provisional Patent Application No. 63/345,546 filed May 25, 2022, the entire disclosure of both applications is incorporated by reference herein.

FIELD

The present disclosure relates to systems and methods for facilitating navigation in a virtual reality space, and more particularly, for generating a teleport graph for facilitating navigation in the virtual reality, video gaming, or real space.

BACKGROUND

Locomotion is a fundamental task in virtual reality (VR) and video gaming. With the recent popularity of consumer-grade VR devices and the increasing availability of high-fidelity virtual environments produced by visual computing technologies, it is crucial to develop effective locomotion techniques to help users navigate immersive and non-immersive (e.g., video gaming) virtual environments. Among various VR locomotion techniques, walking or running are the most natural ones. However, walking and running are typically constrained by the size, and often unlimited size, of the virtual space available. While walking and running based approaches allow continuous movements, teleportation is a common virtual reality (VR) locomotion technique, which supports discrete movements of users without requiring the users to move physically, thereby lifting the play area restrictions. To teleport in the VR space, users first select a target position, and the corresponding virtual viewpoint will be instantly transferred to the selected target position.

While teleportation allows navigation in infinite virtual spaces, it could be challenging for users to choose ideal target positions in a virtual environment. First, users may find it hard to evaluate target positions before they arrive there. The surroundings at the target positions might deviate from what they imagine before teleporting. Second, because users select target teleport positions using a ray cast from their perspective view, it could be difficult to select a target position precisely, especially if the position is far away. Due to these reasons, when navigating a new area, users might need to adjust their positions by teleporting several times.

SUMMARY

Provided in this disclosure is a scene perception-based teleportation approach that facilitates teleportation in indoor virtual reality, augmented reality, mixed reality, or real space (e.g., virtual reality (VR) immersive and video gaming environments, and virtual tours, such as virtual tours of universities, museums, exhibitions, and historical places) by suggesting desirable teleport positions, thereby addressing the above-described problems. Panoramic views at candidate teleport positions are analyzed by extracting scene perception graphs, which encode scene perception relationships between an observer and the surrounding objects, and how desirable the views at these positions are is predicted. Based on the predictions, a set of desirable teleport positions is sampled while considering other navigation properties, such as coverage and connectivity, to connecting one or more of the desirable teleport positions to generate a teleport graph. Using the teleport graph, users can virtually or efficaciously navigate virtual, augmented, or mixed reality space or real space.

In accordance with aspects of the disclosure, a navigation system for facilitating navigation in a space includes a network interface configured to access a representation of a space, a memory storing instructions, and at least one processor coupled with the memory. The at least one processor executes the instructions to detect objects in the representation of the space and determine a plurality of desirable positions which facilitate navigation in the representation of the space based on the detected objects.

In aspects, the objects include dangerous or hazardous areas.

In aspects, the space is a virtual, augmented, mixed reality or real space.

In aspects, the at least one processor executes the instructions further to determine a plurality of navigational positions in the representation of the space. The plurality of navigational positions is determined in a free space, which is free or clear of the detected objects in the representation of the space.

In aspects, the plurality of navigational positions is determined based on a unit area. The unit area is based on a free space, which is free or clear of the objects in the representation of the space, and a predetermined neighboring area from at least one of the plurality of navigational positions.

In aspects, the at least one processor executes the instructions further to generate a panoramic image from at least one of the plurality of navigational positions and calculate a scene perception (SP) score at the at least one of the plurality of navigational positions based on a generated panoramic image.

In aspects, the SP score at the at least one of the plurality of navigational positions is based on visually desirable views. The panoramic image is an observer's first person view at the at least one of the plurality of navigational positions, or an equirectangular panoramic image, which illustrates surroundings with a 360-degree view observed by an observer positioned at the at least one of the plurality of navigational positions.

In aspects, the plurality of desirable positions is determined by selecting a group of desirable positions, of which the SP scores are greater than a predetermined threshold, from among the plurality of navigational positions and generating a teleport graph by connecting the group of desirable positions with edges.

In aspects, the teleport graph includes the group of desirable positions and edges connecting at least one desirable position of the group of desirable positions to another desirable position of the group of desirable positions. The plurality of desirable positions of the teleport graph are connected via edges.

In aspects, the at least one processor executes the instructions further to refine the teleport graph based on cost functions, repeat generation of the group of desirable positions, connecting the group of the desirable positions, and refinement of the teleport graph until a change in a total cost of the teleport graph converges, and output a final version teleport graph after convergence of the total cost.

In aspects, the cost functions include an SP score cost function, which relates to desirable views based on panoramic images.

In aspects, the cost functions include a coverage cost function. The coverage cost function is based on a room coverage, which is indicative of rooms covered by neighborhoods of the plurality of desirable positions of the teleport graph.

In aspects, the cost functions include a redundant coverage cost function indicating a percentage of areas redundantly covered by neighborhoods of the plurality of desirable positions of the teleport graph.

In aspects, the cost functions include a connectivity cost function based on a number of isolated desirable positions of the plurality of desirable positions of the teleport graph.

In aspects, the cost functions include a regularization cost function based on a number, which is predetermined based on a number of desirable positions of the teleport graph.

In aspects, refinement is performed by the at least one processor by adding a position, which is in the plurality of navigational positions but not in the teleport graph, to the teleport graph, deleting a desirable position of the plurality of desirable positions of the teleport graph, or moving a position of one desirable position of the plurality of desirable positions of the teleport graph to a position within a neighborhood of the plurality of desirable positions.

In accordance with aspects of the disclosure, a method for facilitating navigation in a space includes accessing a representation of a space, detecting objects in the representation of the space, and determining a plurality of desirable positions, which facilitate navigation in the representation of the space based on the detected objects.

In aspects, the method further includes determining navigational positions in the representation.

In aspects, the method further includes generating a panoramic image at each of the navigational positions and calculating a scene perception (SP) score at each of the navigational positions based on a generated panoramic image at each of the navigational positions.

In aspects, the plurality of desirable positions is determined by selecting a group of desirable positions, of which the SP scores are greater than a predetermined threshold, from among the navigational positions and generating a teleport graph by connecting the group of desirable positions with edges.

In aspects, the method further includes refining the teleport graph based on cost functions, repeating generation of the group of desirable positions, connecting the group of the desirable positions, and refinement of the teleport graph until a change in a total cost of the teleport graph converges, and outputting a final version teleport graph after convergence of the total cost.

In aspects, refinement is performed by the at least one processor by adding a position, which is in the navigational positions but not in the teleport graph, to the teleport graph, deleting a desirable position in the teleport graph, or moving a position of one desirable position in the teleport graph to a position within a neighborhood of the desirable position.

In accordance with aspects of the disclosure, a nontransitory computer readable medium stores instructions that, when executed by a computer, cause the computer to perform a navigation method for facilitating navigation in a space. The method includes accessing a representation of a space, detecting objects in the representation of the space, and determining a plurality of desirable positions, which facilitate navigation in the representation of the space based on the detected objects.

BRIEF DESCRIPTION OF DRAWINGS

Various aspects and features of the present disclosure are described hereinbelow with reference to the drawings wherein like numerals designate identical or corresponding elements in each of the several views.

DETAILED DESCRIPTION

Provided in this disclosure are scene perception (SP)-based navigation methods and systems to address the above-described challenges. The navigation systems and methods facilitate users to visually perceive the scenes and enable the users to efficaciously navigate a scene in a virtual reality, video game, or other virtual environment, or real space through visually desirable positions. By requiring pairwise visibility for connecting a pair of nodes, connectivity is ensured by a teleport graph, which includes desirable positions and edges connecting pairs of the desirable positions. By refining a teleport graph, users can traverse the whole scene continuously via the refined teleport graph.

In this disclosure, mathematical notations are used. For example, set notations have the following meanings:

"{ }" is used define a set.

$\{x|p(x)\}$ is a set and "|" is a separator between an element "x" and a condition "p(x)". Thus, $\{x|p(x)\}$ is a set including "x" as an element, which satisfies the condition "p(x)".

$|A|$ is a cardinality of set A or a number of elements in set A.

"$x \in A$" indicates that "a" is an element of set A.

$N(p)$ is a set of all neighborhood positions of p. For example, if the neighborhood is defined as a circle with a radius of r, $N(p)=\{p_j||p-p_j|<r\}$.

A graph G is an order tuple of V, which is a set of vertices, and E, which is a set of edges connecting vertices of V and is notated as: $G=(V, E)$. Similarity between two graphs may be computed by using a graph kernel. Further, the following cost function notation is used in this disclosure:

$C(G)$ indicates a cost value with a graph "G".

When two ordered tuples or vectors, $(a_1, a_2, \ldots, a_n)$ and $(b_1, b_2, \ldots, b_n)$, are connected with "·", the two ordered tuples are multiplied by the inner product operator. For example, $$(a_1, a_2, \ldots, a_n)(b_1, b_2, \ldots, b_n) = a_1 b_1 + a_2 b_2 + \ldots + a_n b_n.$$

The absolute value of one ordered tuple or vector may be a norm, which may be an Euclidean norm:

$$|(a_1, a_2, \ldots, a_n)| = \sqrt{(a_1, a_2, \ldots, a_n) \cdot (a_1, a_2, \ldots, a_n)} = \sqrt{a_1^2 + a_2^2 + \ldots + a_n^2}.$$

The following notations are used to differentiate positions from positions in the teleport graph:

"navigational positions" are positions not in the teleport graph, and

"desirable positions" are positions included in the teleport graph.

Figure 1:
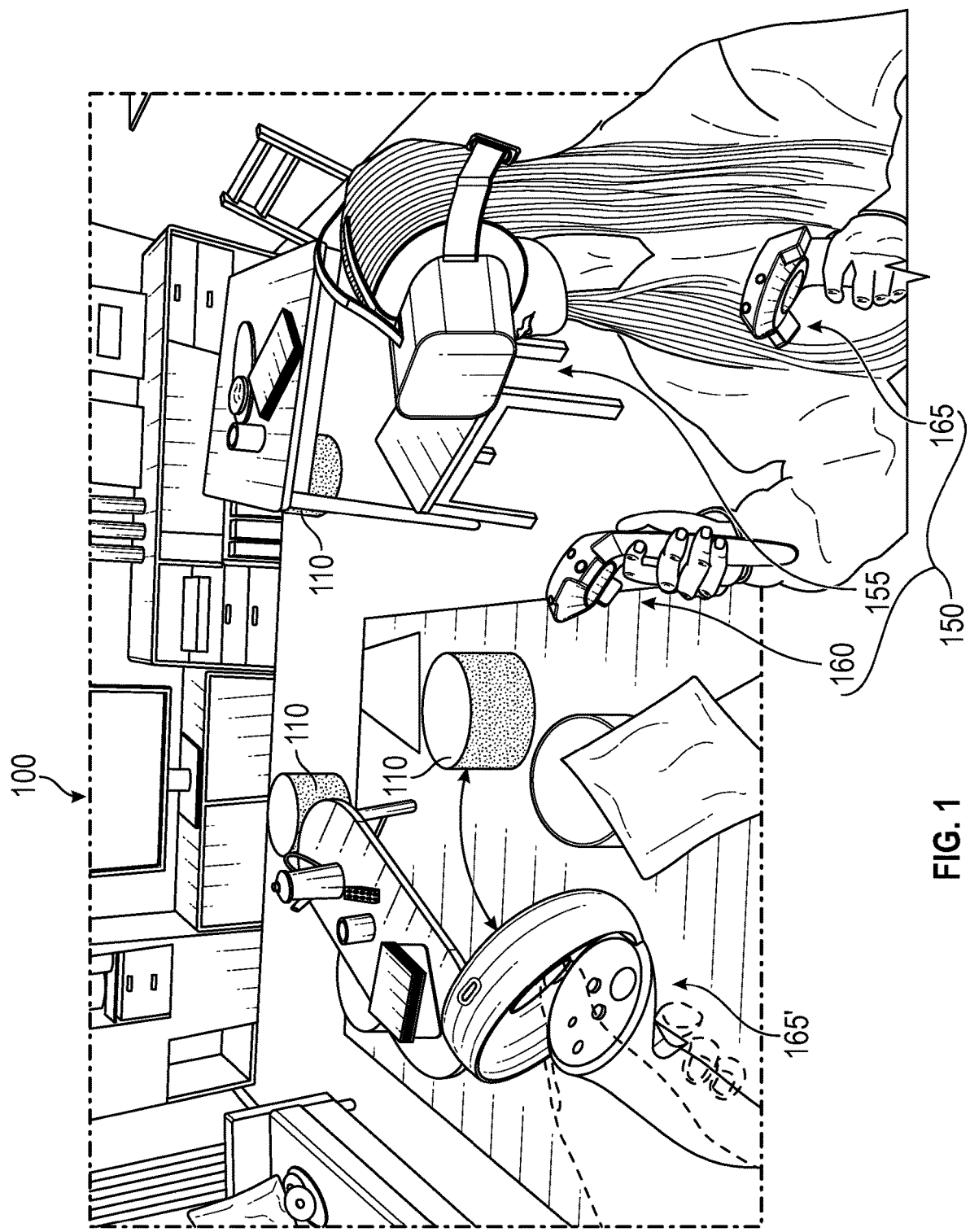
FIG. 1 is a graphical illustration of virtual reality (VR) navigation in a VR space with a VR related device in accordance with aspects of the present disclosure.

FIG. 1 illustrates VR navigation in a VR, augmented reality (AR), or mixed reality (MR), or real space 100 with a VR related device 150 in accordance with aspects of the present disclosure. When a user puts on the VR related device 150, which includes a head-mounted display device (HMD) 155, a first handheld device 160, and a second handheld device 165, the user can see the VR space 100 on the display of the HMD 155. The user uses the first and second handheld devices 160 and 165 to navigate the VR or real space 100 and perform operations in the VR, AR, MR, or real space 100. In the VR, AR, MR, or real space 100, a graphical representation 165' of the handheld devices 160 and 165 may be displayed.

In an aspect, the HMD 155 may be replaced with any display device, which is capable of displaying game environments and virtual tours in real spaces (e.g., museums, exhibitions, educational/financial/business/governmental institutions, offices, and the likes). Further, the handheld devices 160 and 165 may be a keyboard and a mouse, or any other compatible devices. In another aspect, the display device may be a touch screen device and the handheld devices 160 and 165 may be a user's hand, which operates on the touch screen.

The VR or real space 100 may be an artificial space or a real space augmented with virtual objects. For brevity purposes, when a VR space is mentioned herein, the VR space or even a space may refer to a VR, AR, or MR space, other immersive environment, a gaming environment, a real space, or any combination thereof in which a VR related device may or may not be used. The VR space 100 shows teleport positions 110, which are predetermined and are positions desirable for teleportation. When the user picks or selects one teleport position 110 by using the handheld devices 160 and 165, the VR view, which is displayed on the HMD 155, is updated according to the selected position.

Figure 2:
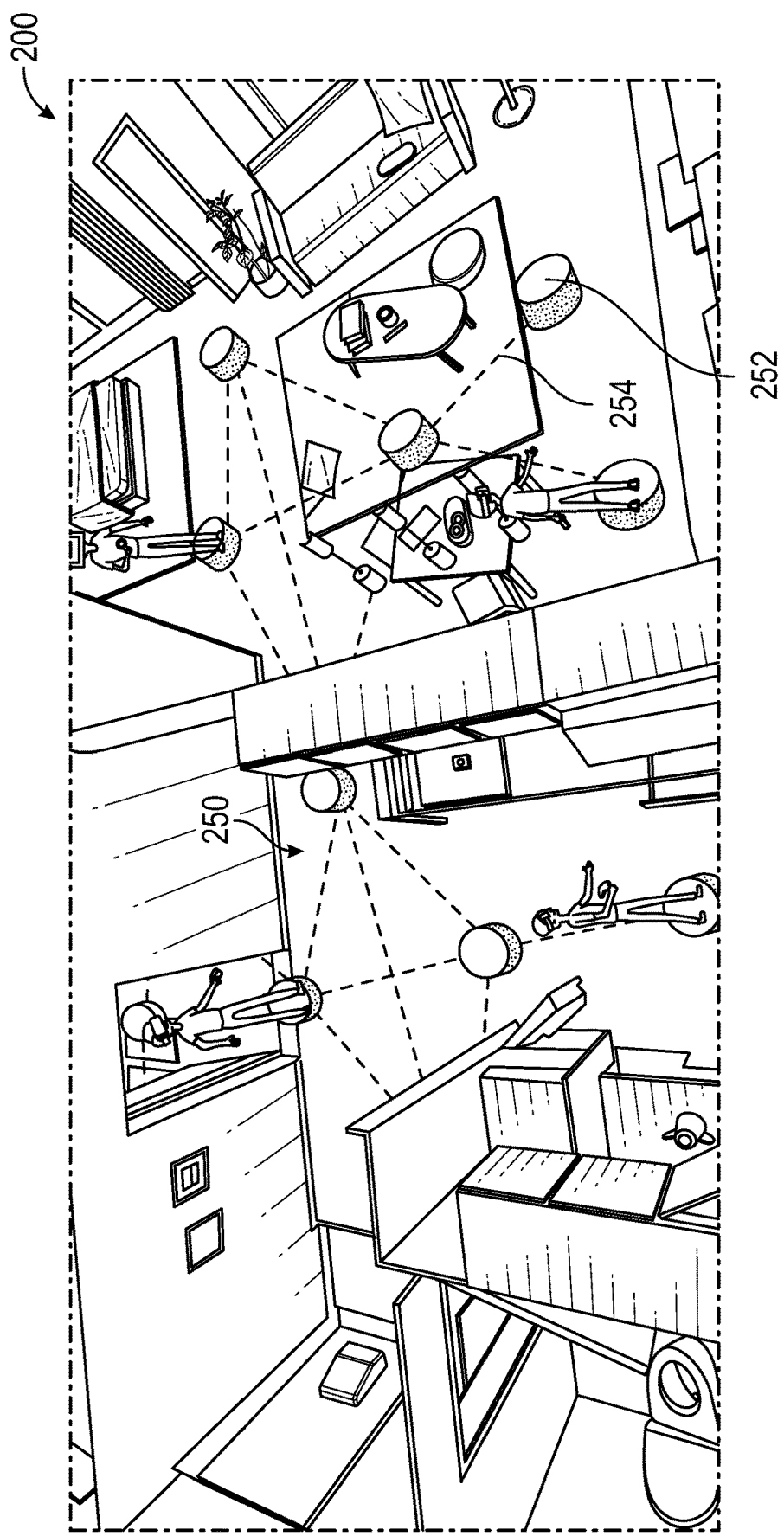
FIG. 2 is a graphical illustration of VR navigation in a VR space with a teleport graph in accordance with aspects of the present disclosure.

By selecting the desirable positions in the VR space and connecting the desirable position to generate a teleport graph, users may be able to efficaciously navigate the whole VR space by following edges of the teleport graph. Now referring to FIG. 2, a teleport graph 250 is displayed over a VR space 200. The teleport graph 250 includes desirable positions 252 and edges 254, which connects two adjacent desirable positions 252. A user may follow the edges 254 to a desirable position to navigate the VR space 200. The desirable positions 252 are navigational positions, where no objects are positioned, in the VR space 200. The edges 254 are not positioned over the objects in the VR space 200. Since users cannot navigate the VR space 200 through walls, the edges 254 cannot be made between two adjacent desirable positions through a wall in the VR space 200. In other words, the desirable positions 252 and the edges 254 are positioned in the VR space 200 free or clear of objects and walls. By selecting an optimal number of desirable positions 252 and connecting the desirable positions 252 with the edges 254, users can efficaciously navigate the whole VR space 200 by following the edges 254 with the optimum number of the desirable positions 252 of the teleport graph 250.

Figure 3:
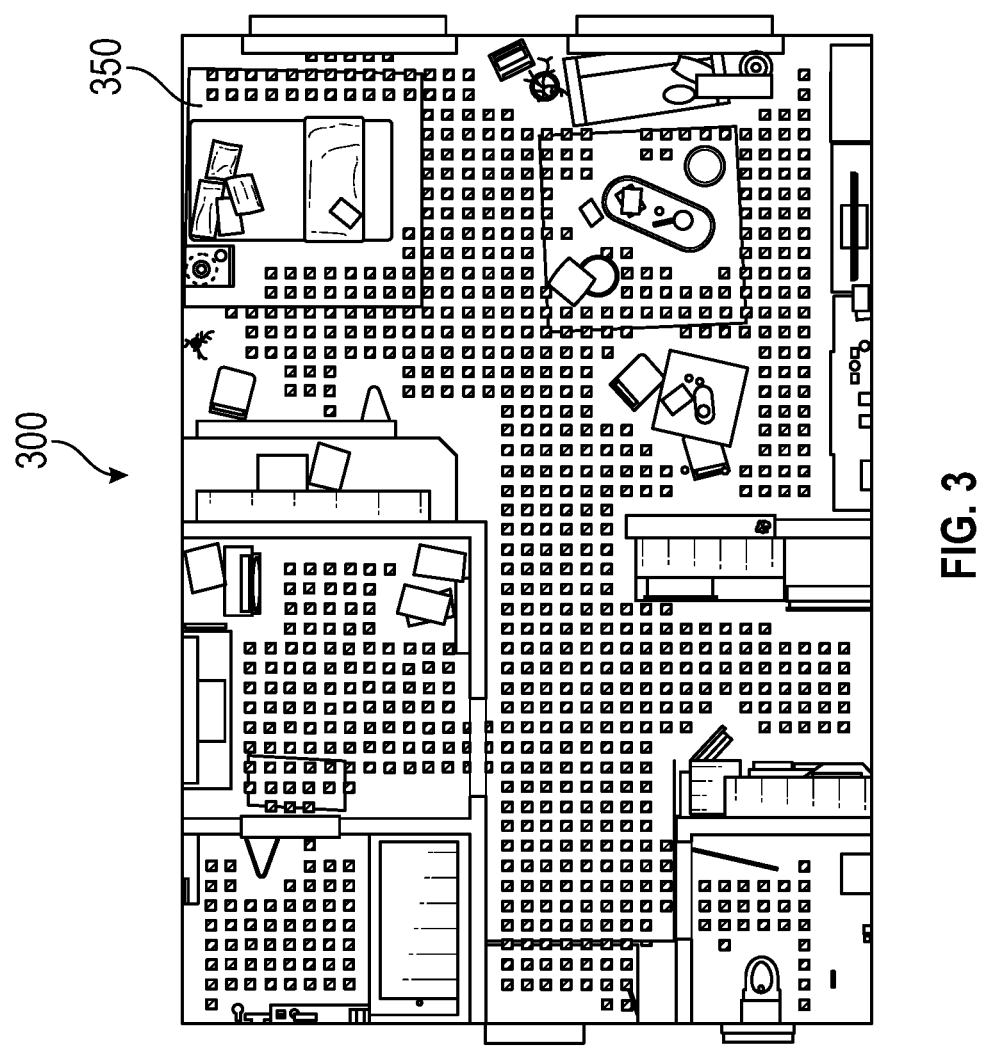
FIG. 3 is a graphical illustration of possible positions for VR navigation in a graphical representation of a VR space in accordance with aspects of the present disclosure.

FIGS. 3-12 illustrate how to generate an optimal teleport graph for efficacious navigation when a VR space is provided according to aspects of the present disclosure. When a graphical representation of a VR space is provided or obtained, firstly, objects and walls are detected. FIG. 3 illustrates a graphical representation, which is a two-dimensional (2D) view 300 of the VR space from the top. After objects and walls, on which users cannot virtually stand in the VR space, are detected, navigational positions 350, on which users can virtually stands or in which there are no objects, are marked in the 2D view 300. In an aspect, each navigational position 350 may be a center of a unit area in the 2D view 300. The unit area may be predetermined and has a square or circle shape. In a case where the unit area is a square, most of the free space may be filled with the navigational positions 350. However, in another case when the unit area is a circle, coverage of the free space by the navigational positions 350 may be less than or equal to 78.79% or π/4.

In another aspect, a target number of the navigational positions 350 may be predetermined. In this case, the unit area may be determined based on the total area of the free space and the target number of the navigational positions 350. Every navigational position 350 is positioned at the center of the unit area.

After the navigational positions 350 are positioned in the VR space, a panoramic image is generated at each navigational position 350. The panoramic image is an image viewed by an observer or user who stands at the corresponding navigational position and is an observer's comprehensive first-person view at the corresponding navigational position. Further, the panoramic image shows 360-degree surroundings around the corresponding navigational position in the VR space.

In an aspect, the panoramic view may be in RGB-D format, which concatenates RGB features and depth features. For example, the depth features may be obtained from a laser-speckle pattern. Thus, RGB-D panoramic view may be a combination of RGB-image and a laser-speckle image. Other type of RGB-D panoramic view may be also utilized without departing from the scope of this disclosure.

Figure 4A:
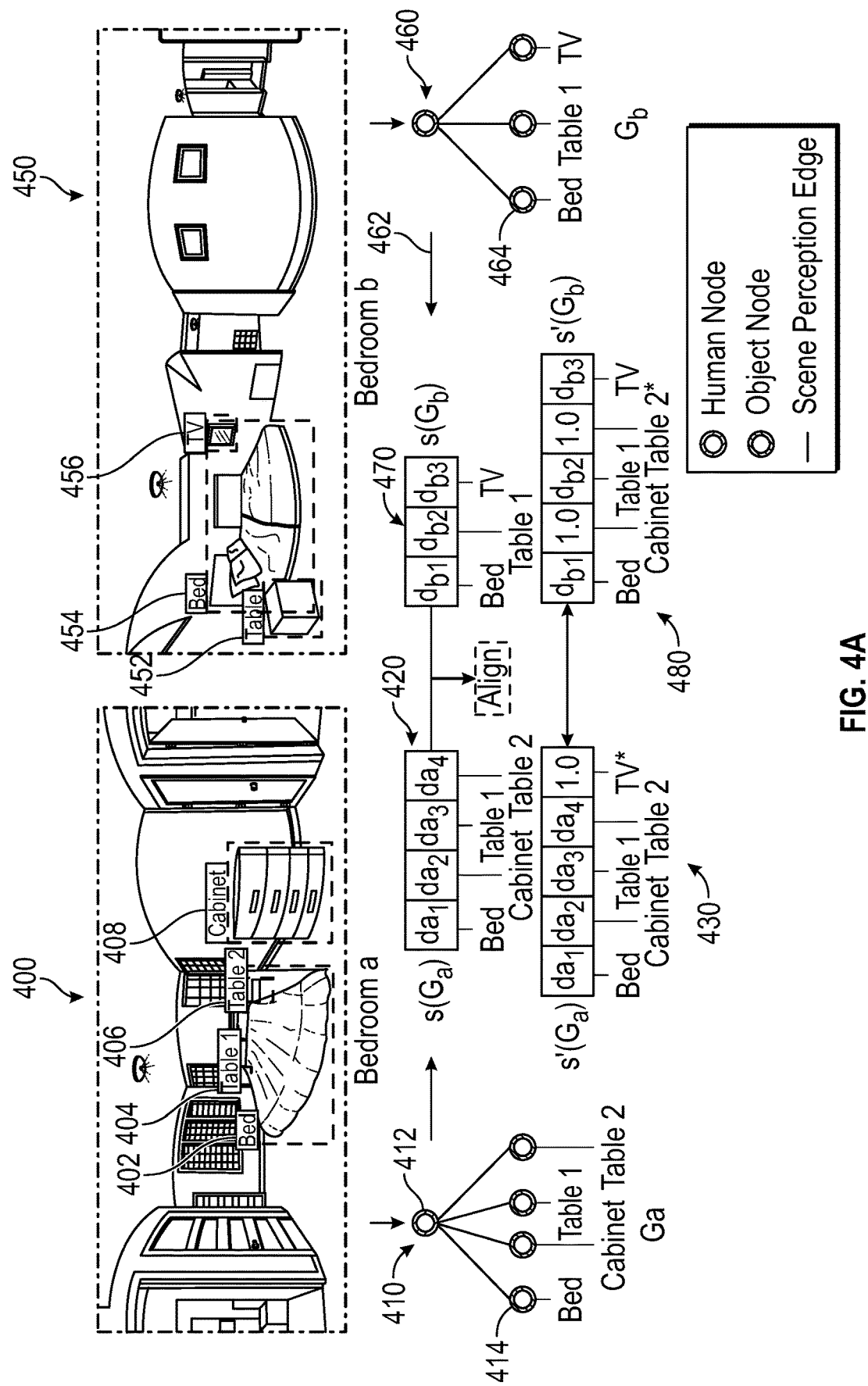
FIG. 4A illustrates combining two scene perception (SP) graphs in accordance with aspects of the present disclosure.

Provided in FIG. 4A are panoramic views 400 and 450 from two different navigational positions according to aspects of the present disclosure. As shown in FIG. 4A, the panoramic views 400 and 450 may be equirectangular images. In an aspect, panoramic views may be in a circular shape or any other shapes. After a panoramic view at each navigational position is generated and corresponding SP graphs are also generated, an SP score is predicted at each navigational position. The SP scores are based on desirability or human preferences. In this regard, a reference panoramic view may be needed to be compared with each panoramic view. The machine learning algorithm may be a graph attention network (GAT) algorithm. The machine learning algorithm may be trained with VR spaces including human-marked positions as optimal examples.

Thus, when the VR space 300 is given, the machine learning algorithm may find a reference panoramic view for each of the rooms in the VR space 300 by generating the reference panoramic view from a human-marked position. Then, a panoramic view at a navigational position may be compared with the corresponding reference panoramic view to calculate the SP score, which indicates how similar the panoramic view is to the reference panoramic view at the navigational position. Detailed description of calculating an SP score at each navigational position can be found below.

In the panoramic view 400, it is required to detect objects with its category label. For example, object 402 is a bed, object 404 is a table labeled as "Table 1", object 406 is a table labeled as "Table 2", and object 408 is a cabinet. Each of the objects 402-408 may be surrounded by a rectangle. Likewise, object 452 is a Table labeled as "Table 1", object 454 is a bed, and object 456 is a TV in the panoramic view 450.

Based on the detected objects 402-408 in the panoramic view 400 and the detected objects 452-456 in the panoramic view 450, scene perception (SP) graphs 410 and 460 are generated, respectively. Each SP graph includes two nodes based on category feature: the first node or category is a human node and the second node or feature is an object node. Thus, the SP graph 410, $G_a$, includes the human node 412 and four object nodes 414 because four objects are detected in the panoramic view 400, and the SP graph 460, $G_b$, includes the human node 462 and three object nodes 464 because three objects are detected in the panoramic view 450. Any humans, who are detected in the panoramic view 400 and 450, other than the observer are removed.

The category feature corresponds to semantic labels of detected objects in the VR space. For example, the category features may include bed, table, cabinet, TV, lights, window, picture, chair, sink, bathtub, mirror, and the like. Thus, when there are two tables detected in one VR space, numerals are added to the same category so that "Table 1" and "Table 2" can be the labels thereof as in the panoramic view 400.

The connection between the human node and an object node is an edge, which may have depth information therebetween. The depth information may be calculated by averaging all distances between the human node and each point in the rectangular region surrounding the object.

Generally speaking, the SP graph, G, is an ordered tuple, (V, E), where V is a set of nodes, where $V=\{v_0, v_1, \ldots, v_n\}$, and E is a set of edges, where $E=\{e_{0,1}, e_{0,2}, \ldots, e_{0,n}\}$ and $e_{i,j}$ is an edge pointing from node $v_i$ to node $v_j$. The last subscript "n" of v of V is the number of detected objects, and $v_0$ is the observer or human node.

By combining the depth information and the objects, flattened sequences 420 and 470, $s(G_a)$ and $s(G_b)$, are generated. The flattened sequence 420 $s(G_a)$ has four elements therein and each value of the four elements is a depth value or distance between the observer and each detected object. In an aspect, the depth value may be normalized to be [0, 1]. The depth value "0" means zero distance or the human node itself and the depth value "1" denotes being infinitely far from the human node. Likewise, the flattened sequence 470 $s(G_b)$ has three elements corresponding to the number of the detected objects 452-456.

In an aspect, the flattened sequence may be sorted first by the category feature and then by the depth value. Since the human node is universal in the flattened sequence, the human node is not included therein. It is noted that the SP graph and its corresponding flattened sequence are equivalent.

To compare two SP graphs, firstly, the lengths of two SP graphs are made to be the same via aligned flattened sequence. In this example, the length of the flattened sequence 420 $s(G_a)$ is different from the length of the flattened sequence 470 $s(G_b)$. Thus, the flattened sequences 420 $s(G_a)$ and 470 $s(G_b)$ may be lengthened so that new aligned flattened sequences have the same length. In this regard, the category feature may be used to make them have the same length. Since all categories of the flattened sequence 470 $s(G_b)$ except "TV" are in the flattened sequence 420 $s(G_a)$, the TV element is added to the flattened sequence 420 $s(G_a)$ as the last element so that the aligned flattened sequence 430 $s'(G_a)$ has five elements. The depth value of the TV element of the aligned flattened sequence 430 $s'(G_a)$ is set to be "1", meaning that the TV is infinitely far away from the observer, or, in other words, the TV is not detected in the panoramic view 400.

To re-order the elements of the flattened sequence 470 $s(G_b)$ as in the aligned flattened sequence 430 $s'(G_a)$, the aligned flattened sequence 480 $s'(G_b)$ has the first element of "bed" of the flattened sequency 470 $s(G_b)$, a new element in the second element for "cabinet", the second element for "table 1" of the flattened sequency 470 $s(G_b)$ in the third element, a new element in the fourth element for "table 2", and the third element for TV of the flattened sequency 470 $s(G_b)$ in the fifth element. The depth values for the new elements in the aligned flattened sequence 480 $s'(G_b)$ are all "1" to indicate that the objects in the new elements are infinitely far away from the observer in the panoramic view 450. In this way, the category features of each element in the aligned flattened sequence 430 $s'(G_a)$ and the corresponding element in the aligned flattened sequence 480 $s'(G_b)$ are made same in order and the depth values can be compared with each other.

A similarity score between two SP graphs may be calculated by a graph kernel. For example, a graph kernel K may be defined between two SP graphs $G_a$ and $G_b$ as:

$$K(G_a, G_b) = \frac{s'(G_a) \cdot s'(G_b)}{|s'(G_a)||s'(G_b)|},$$

Where s' ($G_a$) and s' ($G_b$) indicate aligned flattened sequences of the SP graphs $G_a$ and $G_b$, respectively, and have the same length. The notation "·" means an inner product. The maximum value of K($G_a$, $G_b$) is 1 when the SP graphs $G_a$ and $G_b$ are equal. Thus, the closer to 1 the similarity score is, the more similar the SP graphs $G_a$ and $G_b$ are. On the other hand, when K($G_a$, $G_b$) is zero, the SP graphs $G_a$ and $G_b$ are orthogonal to each other or in other words, do not have any similarity. Thus, the closer to zero the similarity score is, the more dissimilar the SP graphs $G_a$ and $G_b$ are.

Similar to the above-described comparison between the SP graphs $G_a$ and $G_b$, each panoramic view is compared to the corresponding reference panoramic view and an SP score may be calculated for each navigational positions by computing a similarity score via the graph kernel.

The graph kernel may be cosine similarity as described above, a random walk graph kernel, or Weisfeiler-Leman graph kernel. This list is not exhaustive but provided to give examples. Other graph kernel appreciated by a person having ordinary skill in the art may be used.

In an aspect, an SP predictor may be used to calculate SP scores via machine learning algorithms in a data driven manner because above-described calculation of an SP score may be computationally challenging due to many steps and many calculations. The SP predictor may be trained with many panoramic views and their SP scores and learn to predict an SP score when a panoramic view is given. By using supervised methods, more weights are given to positive results meaning that the predicted SP score is close to the actual SP score and less weights are given to the negative results.

In another aspect, the SP predictor may be trained via a graph convolution network (GCN). One benefit to use the GCN is that the input data does not need to be organized in the Euclidean domain. By incorporating attention mechanisms, the GCN may be able to determine which nodes should be paid more weights during the graph convolution process. Node features are updated after the convolution, and the final feature of the human node is passed into a multi-layer perceptron network to produce a floating-point value as a SP score.

Figure 4B:
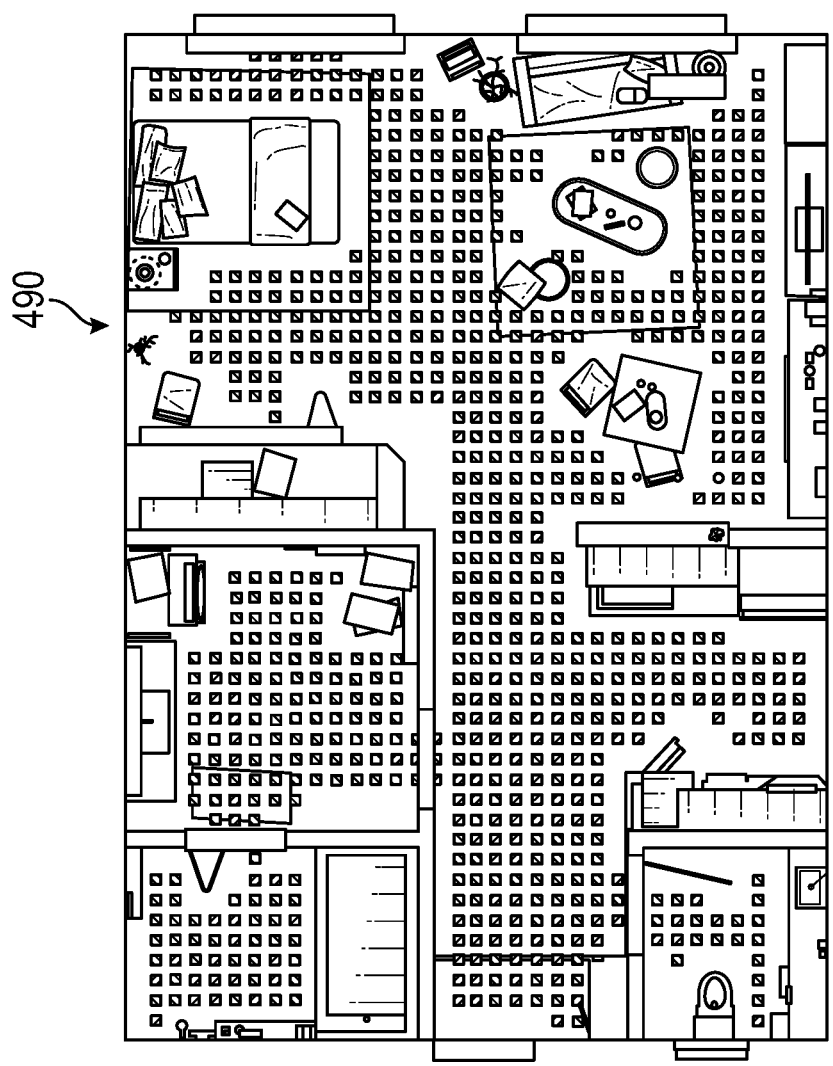
FIG. 4B is a graphical illustration of an SP map in accordance with the aspects of the present disclosure.
Figure 5:
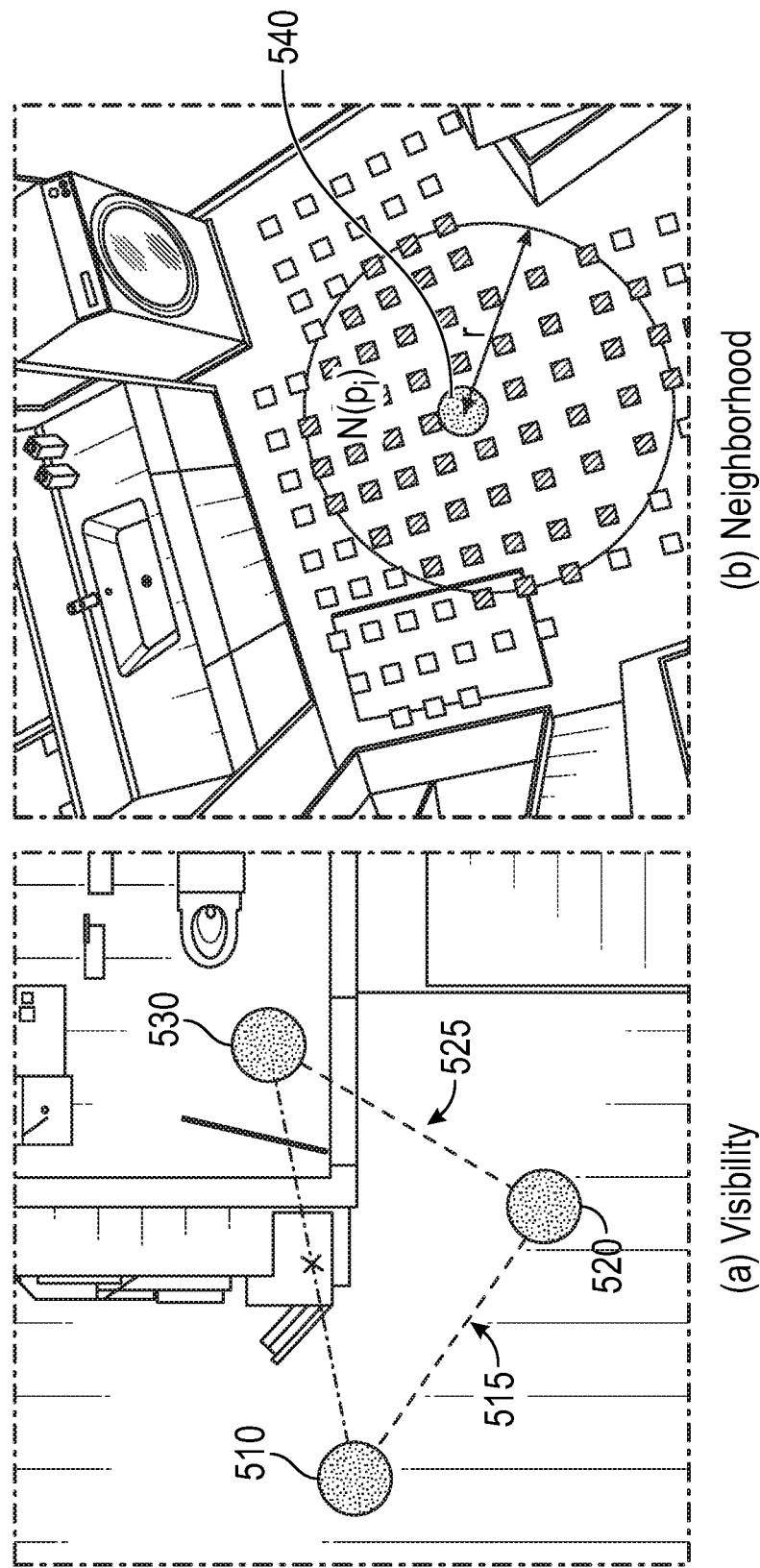
FIG. 5 illustrates adding a desirable position based on visibility and neighborhood in accordance with aspects of the present disclosure.

After calculating SP scores in all navigational positions, FIG. 4B provides an SP map 490 in the virtual space. The SP map 490 shows an SP score on each all navigational positions. The SP scores are shown in gray scale in the SP map 490. Based on this SP map 490, a teleport graph G may be generated based on visually desirable positions, which are navigational positions and their SP scores are higher than a threshold value, and edges connecting desirable positions and may be refined based on constrains or cost functions.

To be clear and brief without losing general concept, the following conventional notations are used.

P={$p_i$} is used as a set of all navigational positions pi.
G+(V, E) is used as ordered tuples for a teleport graph G, where the V={$p_i$*} is used as a set of all desirable positions $p_i$* in the teleport graph G and E={$e_{ij}$} is used as a set of edges connecting two desirable positions. In particular, $e_{ij}$ represents an undirected edge connecting nodes $p_i$* and $p_j$*. It is noted that V is a subset of P.

N($p_i$) is used as a neighborhood set of $p_i$, and includes all navigational positions around $p_i$ with a radius of r, and is defined by {$p_i$|$p_j \in P \wedge |p_i - p_j| < r$}, where the symbol "$\wedge$" represents the logical operator "AND" meaning that both conditions around "AND" must be satisfied.

M is a mapping function, and used to map a navigational position to its SP score $y_i$ such as M($p_i$)=$y_i$.

The desirable positions of V of the teleport graph G may be selected based on the SP scores, which are greater than a predetermined threshold, and the edges of E of the teleport graph G may be set based on visibility and a distance. Now referring to FIG. 5, there are three desirable positions 510-530 and two edges 515 and 525 in the teleport graph G. The reason why there is no edge between desirable positions 510 and 530 is that an observer standing on the desirable position 510 cannot see the desirable position 530 and vice versa. The visibility may be determined by casting ray from one desirable position to another desirable position and determining whether one can be seen from the other. Further, an edge may not be added to the teleport graph G when the distance between two desirable positions is greater than or equal to a threshold value (e.g., 8 meters or about 27 feet). The threshold value for the distance may be greater or less than 8 meters based on the size of the VR space.

When selecting a new desirable position, if the new desirable position is within a neighborhood of an already selected desirable position, the new desirable position may not be added to the teleport graph G. By predetermining the radius of the neighborhood, the target number of desirable positions in V may be correspondingly determined. The radius of the neighborhood may be set based on user's preference in traversing the VR space. In a case where a user wants to see details of the VR space, the radius may be set less than a default value (e.g., one meter), and in a case where the user wants to see the VR space fast, the radius may be set greater than the default value. Since edges can be set based on desirable positions, edges need updated when the number of desirable positions in V changes.

When a set of navigational positions is randomly selected for V based on the SP scores, there is no guarantee that the selected navigational positions would be the optimum desirable positions for navigation. Thus, the selected candidate portions for V needs refinement so that more desirable and efficacious positions may remain in the teleport graph G. During the refinement, several factors are utilized via cost functions, which includes an SP score cost function $C_{SP}(G)$, a coverage cost function $C_{COV}(G)$, a redundant coverage cost function $C_{RCOV}(G)$, a connectivity cost function $C_{CON}(G)$, and a regularization cost function CREG(G). Total cost of these cost functions may be calculated to determine whether or not the teleport graph G is optimum.

Figure 6:
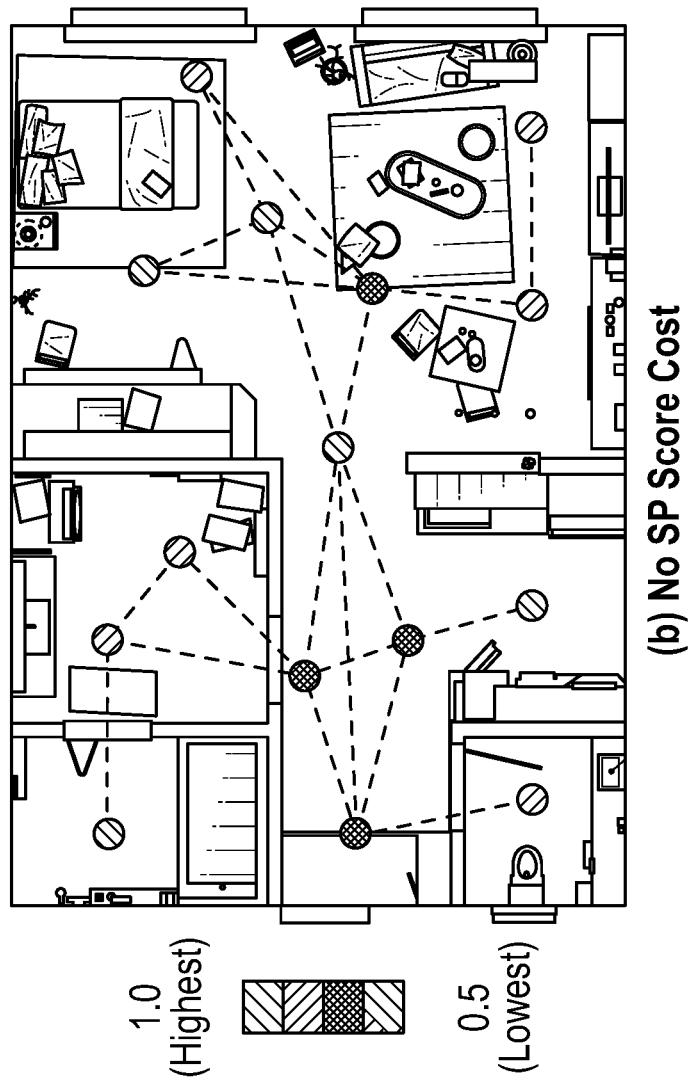
FIG. 6 is a graphical illustration of a potential teleport graph without consideration of SP score costs in accordance with aspects of the present disclosure.

Positions in V with high SP scores suggest that an observer standing at the positions will have desirable views. As illustrated in FIG. 6, the most positions are close to the minimum SP value, 0.5. If the SP score is not considered, positions with low SP scores may be selected for the teleport graph G and observers will experience visually poor navigation in the VR space. Thus, without considering SP scores, the positions in V may not have desirable view. In this regard, the SP score cost function $C_{SP}(G)$ may be defined as:

$$C_{SP}(G) = \left(1 - \frac{\sum_{p_i^* \in V} M(p_i^*)}{|V|}\right)^2,$$

where $\Sigma_{p_i^* \in V} M(p_i^*)$ represents a sum of SP scores for all selected positions $p_i^*$ in V and |V| represents a cardinality of V. Since the SP scores are less than or equal to $$1, \frac{\sum_{p_i^* \in V} M(p_i^*)}{|V|}$$

represents a mean SP score. Thus, when positions with low SP scores are selected and the sum of SP scores is small, the SP score function becomes large, thereby positions in V with low SP scores being penalized.

Figure 7:
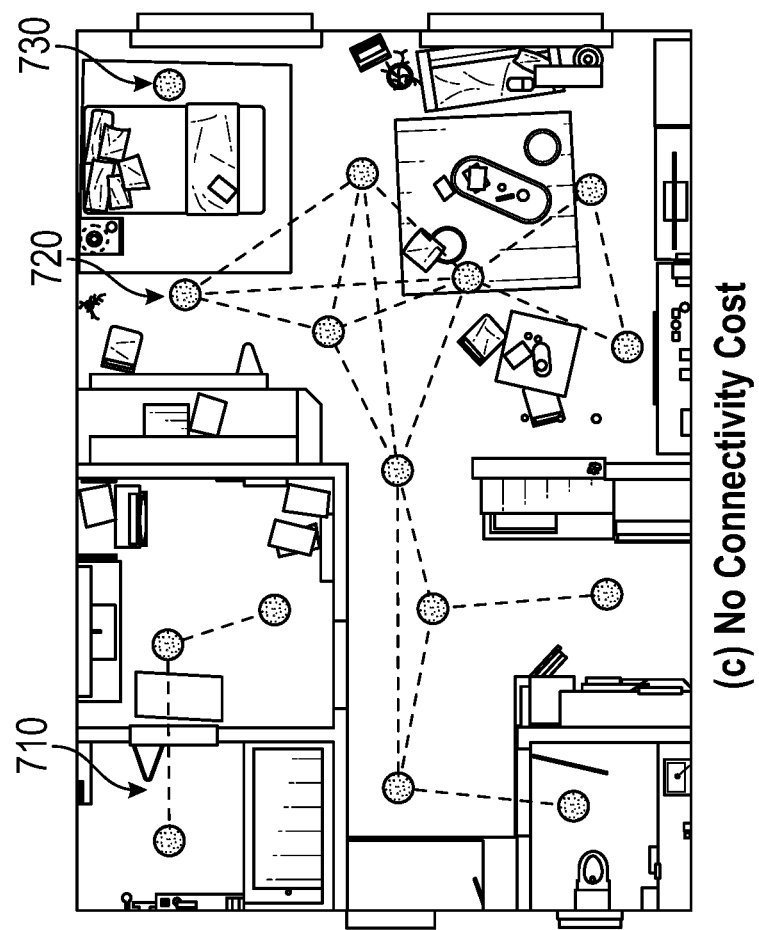
FIG. 7 is a graphical illustration of a potential teleport graph without consideration of connectivity costs in accordance with aspects of the present disclosure.

Now referring to FIG. 7, three isolated graphs 710-730 in V are illustrated. Any navigational position in the isolated graph 710 is connected via edge to the isolated graphs 720 and 730. Isolated graph means that users may not be able to experience smooth and convenient VR navigation in the VR space. For example, if a user selects the isolated graph 730, the user cannot move to positions other than the position in 730. Likewise, if the user selects the isolated graph 710, the user's navigation is limited within the small rooms. Even if the user selects the isolated graph 720, the use may not be able to navigate the whole VR space. Hence, to penalize isolated graphs in G, the connectivity cost function is defined as:

$$C_{CON}(G) = 1 - e^{1-k},$$

where k represents several isolated graphs in G. If there is only one graph in G, the connectivity cost function results in 0. Otherwise, the connectivity cost function outputs non-zero value so that the teleport graph G is penalized.

The teleport graph G is expected to help users navigate the VR space efficaciously. Thus, the teleport graph G needs to cover as much free space in the VR space as possible. At the same time, however, desirable positions in the teleport graph G are better to be away from each other by a reasonable distance. To balance the distance and the free space coverage, a set of covered positions is defined:

$$V_{COV} = \{p_i | \exists p_j^* \in V s.t. p_i \in N(p_j^*)\},$$

where $\exists p_j^* \in V$ represents that there is at least one $p_j^*$ in V, $p_i \in N(p_j^*)$ represent $p_i$ is in a neighborhood of $p_j^*$, and "s.t." stands for "such that". Thus, $V_{COV}$ includes all navigational positions $p_i$ in P, which is included in a neighborhood of at least one desirable position $p_j^*$ in V.

Figure 8:
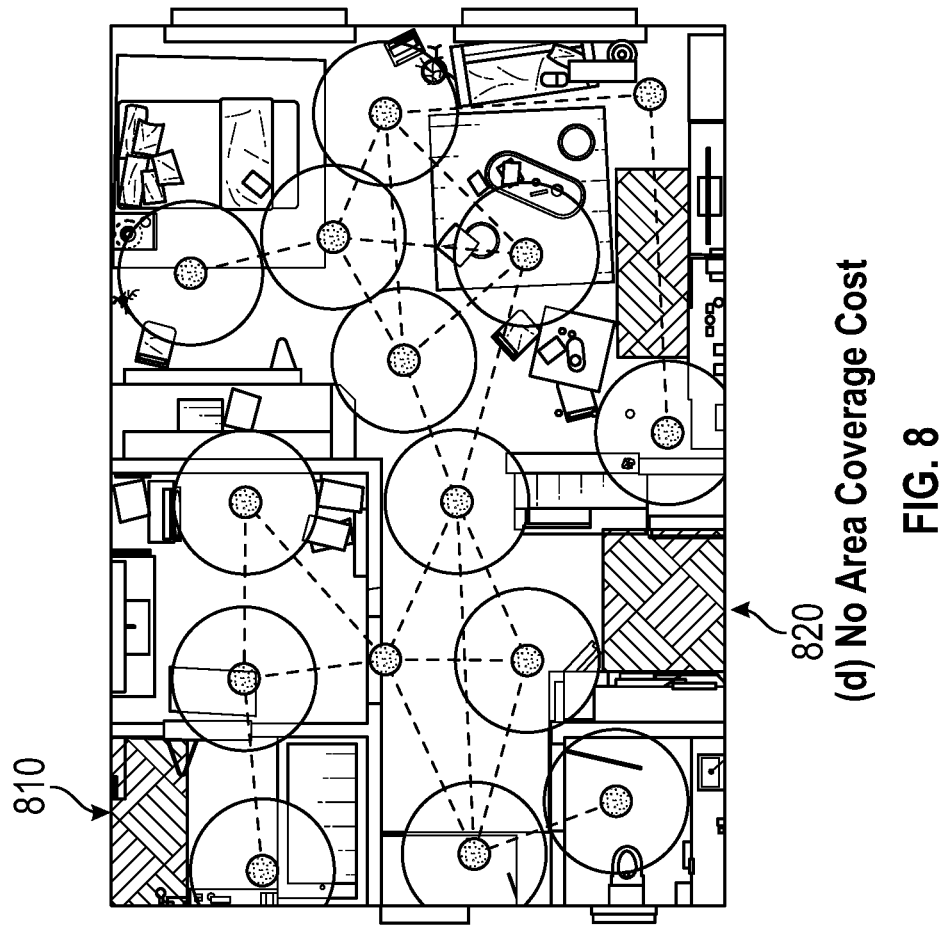
FIG. 8 is a graphical illustration of a potential teleport graph without consideration of area coverage costs in accordance with aspects of the present disclosure.

The coverage cost function $C_{COV}(G)$ may combine an area coverage cost function $C_{AG}(G)$ and a room coverage cost function $C_{RC}(G)$. FIG. 8 illustrates a case when the area coverage cost function $C_{AG}(G)$ is not considered. The circular areas around desirable positions of the teleport graph are neighborhoods of the desirable positions, and the shaded areas 810 and 820 show no coverage by the teleport graph G. To penalize the no coverage area, the area coverage cost function is defined as:

$$C_{AG}(G) = \left(1 - \frac{|V_{COV}|}{|P|}\right)^2,$$

where |P| is a cardinality of all navigational positions and $|V_{COV}|$ is a cardinality of all navigational positions contained in a neighborhood of at least one desirable position in V.

Figure 9:
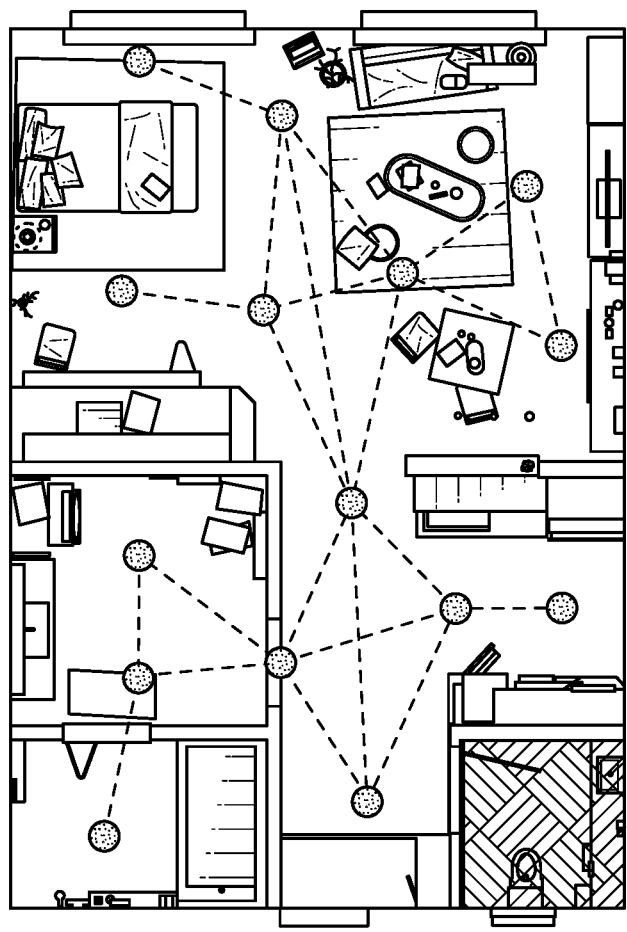
FIG. 9 is a graphical illustration of a potential teleport graph without consideration of room coverage costs in accordance with aspects of the present disclosure.

The room coverage consideration is illustrated in FIG. 9. Even though the bathroom area 910 is small in the VR space, the teleport graph G does not cover the whole VR space.

Since the whole purpose of the teleport graph G is to navigate the whole of the VR space, the room coverage cost function $C_{RC}(G)$ penalizes when a room is not covered. In this regard, a room may be considered as being covered if there is at least one desirable position in V inside the room. The room coverage cost function may be defined by:

$$C_{RC}(G) = (1 - \varphi)^2,$$

where $\varphi$ is a percentage of covered rooms over all rooms.

The coverage cost function may be calculated by adding the area coverage cost function and the room coverage cost function with respective weight by:

$$C_{COV}(G) = w_{AC} C_{AC}(G) + w_{RC} C_{RC}(G),$$

where $w_{AC}$ is a weight for the area coverage cost function and $w_{RC}$ is a weight for the room coverage cost function.

Figure 10:
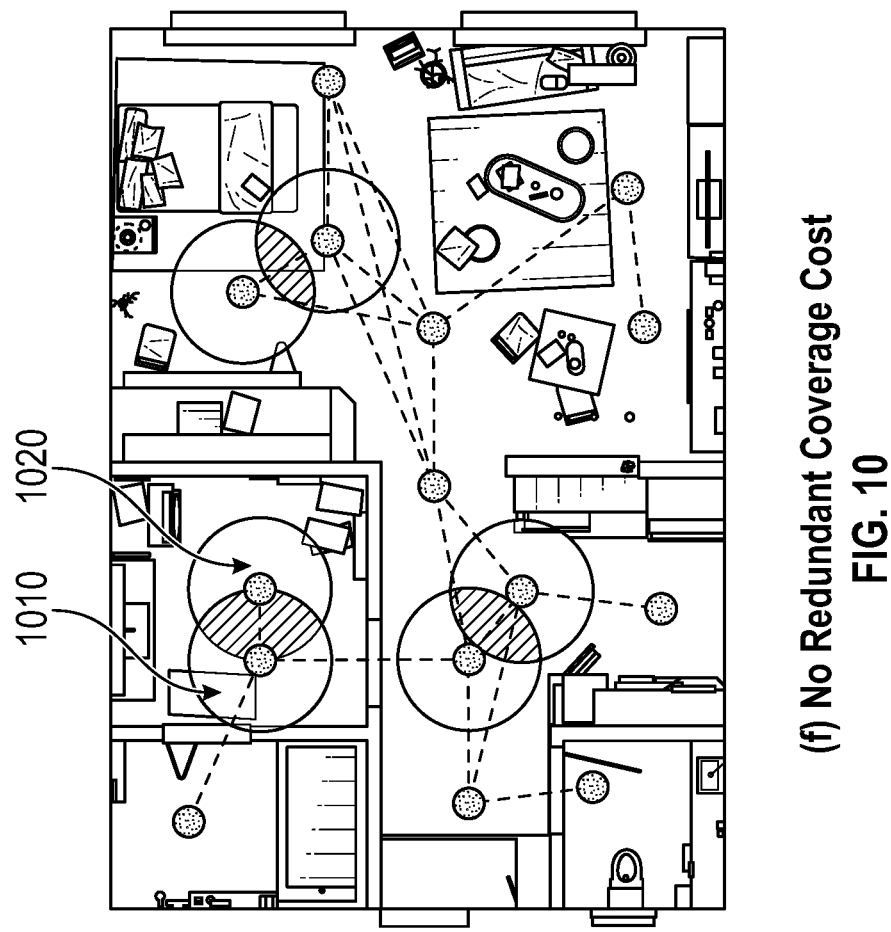
FIG. 10 is a graphical illustration of a potential teleport graph without consideration of redundant coverage costs in accordance with aspects of the present disclosure.

FIG. 10 illustrates a case when no redundant coverage is considered. For example, a neighborhood 1010 and another neighborhood 1020 have an overlapped area. That means the corresponding desirable positions of the neighborhoods 1010 and 1020 are too close so that the overlapped area is redundantly covered by two desirable positions, thereby the teleport graph G being considered as not being optimal. The set of positions in the redundantly overlapped area may be defined as:

$$V_{RCOV} = \{p_i | \exists p_j^*, p_k^* \in V \ s.t. p_i \in N(p_j^*) \land p_i \in N(p_k^*)\}.$$

Then, the redundant coverage cost function may be defined by:

$$C_{RCOV}(G) = \left(\frac{|V_{RCOV}|}{|P|}\right)^2,$$

where $$\frac{|V_{RCOV}|}{|P|}$$

approximates a ratio of the portion of redundantly covered area over the total free space in the VR space.

The regularization is related to an optimum number of desirable positions in V, which is predetermined based on the total number of navigational positions in P. Relationship between the optimum number of desirable positions in V and the total number of navigational positions in P may be provided by a polynomial function $\lambda(|P|)$. A machine learning algorithm may be trained with VR spaces and human-marked desirable positions to find the polynomial function $\lambda(|P|)$. When a VR space is given, a total number of navigational positions may be identified after detecting objects in the VR space. Further, based on human-marked desirable positions, the machine learning algorithm may be able to find the polynomial function $\lambda(|P|)$, which provides an optimal number of desirable positions in V. The function may be an exponential function, a combination of harmonic functions, or any type of function, which can present the relationship between the optimum number of desirable positions in V and the total number of navigational positions in P.

The regularization cost function may be defined by:

$$C_{REG}(G) = \begin{cases} 0 & \text{if } |V| \leq \lambda(|P|) \\ \gamma_1^{|V| - \lambda(|P|) + \gamma_2} & \text{otherwise} \end{cases},$$

where $\gamma_1$ and $\gamma_2$ are hyperparameters, which are used to control the machine learning algorithms for the polynomial function $\lambda(|P|)$. In an aspect, $\gamma_1$ and $\gamma_2$ are 2 and −5, respectively.

The total cost C(G) may be obtained by summing all the cost values from the above-described the cost functions with respective weights by:

$$C(G)=w_{SP}C_{SP}(G)+w_{COV}C_{COV}+w_{RCOV}C_{RCOV}(G)+w_{CON}C_{CON}(G)+w_{REG}C_{REG}(G),$$

where $w_{SP}$ is a weight for the SP score cost function $C_{SP}(G)$, $w_{COV}$ is a weight for the coverage cost function $C_{COV}(G)$, $w_{RCOV}$ is a weight for the redundant coverage cost function $C_{RCOV}(G)$, $w_{CON}$ is a weight for the connectivity cost function $C_{CON}(G)$, and $w_{REG}$ is a weight for the regularization cost function $C_{REG}(G)$. For example, $w_{SP}$ is 3, $w_{COV}$ is 1.5 with $w_{AC}$ being 0.7 and $w_{RC}$ being 0.3, $W_{RCOV}$ is 1.0, $w_{CON}$ is 2.0, and $W_{REG}$ is 1.0. When the value of the total cost function C(G) is greater than a predetermined threshold value, the change (e.g., an added, removed, or moved desirable position) may discarded and the original teleport graph G is restored. When not, the change is approved and is incorporated into the original teleport graph G.

In an aspect, the total cost function may include a danger cost function $C_{DANGER}(G)$, which provides a higher cost value when a desirable position is near a dangerous object or environment than when the desirable position is away from the dangerous object or environment. For example, the danger cost function $C_{DANGER}(G)$ may be a sum of individual cost values (e.g., distances) based on dangerous objects or environment. For example, let D be a set of dangerous objects and environment as defined by:

$D=\{d_i|d_i$ is a dangerous object or environment$\}$.

Then, the danger cost function $C_{DANGER}(G)$ may be defined by:

$$C_{DANGER}(G)=\Sigma_{p_i\in V \wedge d_j \in D}|p_i-d_j|,$$

where $|p_i-d_j|$ may be a distance between $p_i$ and $d_j$. This danger cost function $C_{DANGER}(G)$ may be multiplied by a danger weight, $W_{DANGER}$, and then added to the above-described cost functions to calculate the total cost C(G).

In another aspect, the total cost function may include a preference cost function $C_{PREFER}$, which provides a higher cost value when a desirable position is near a preferred position than when the desirable position is far away from the preferred position. For example, let F be a set of preferred positions as defined by:

$F=\{f_i|f_i$ is a preferred position$\}$.

Then, the preference cost function CPREFER may be defined by:

$$C_{PREFER}(G)=1\div\Sigma_{p_i\in V \wedge f_j\in F}|p_i-f_j|.$$

where $|p_i-f_j|$ may be a distance between $p_i$ and $f_j$. This preference cost function $C_{PREFER}(G)$ may be multiplied by a preference weight, $w_{PREFER}$, and then added to the above-described cost functions to calculate the total cost.

In an aspect, the total cost C(G) may be calculated by adding any combination of the above-described cost functions. In another aspect, the total cost C(G) may include other cost functions based on the location, size, characteristics of the VR space or user's preferences.

The teleport graph G may be refined by adding a navigational position to or removing a desirable position from the teleport graph G and by moving a desirable position of the teleport graph G. Initially, navigational positions, of which SP scores are greater than or equal to a threshold value, are selected as desirable position of an initial teleport graph G. The number of desirable positions may be determined based on the area of the VR space. As described above, the polynomial function $\lambda(|P|)$ may determine the optimal number of desirable positions of the initial teleport graph G.

Refinement may be repeatedly performed after one of three actions, which are addition of a navigational position, deletion of a desirable position, or movement of a desirable position within by calculating the total cost. Frequencies of probability of choosing three actions may be predetermined. For example, the probability of choosing the addition action, $\mathbb{P}_a$, may be 0.2, the probability of choosing the deletion action, $\mathbb{P}_d$, may be 0.2, and the probability of choosing the movement action, $\mathbb{P}_m$, may be 0.6. These probabilities may be adjusted based on the current number of desirable positions in the teleport graph G. In a case when the current number of desirable positions in the teleport graph G is less than the optimal number, then $\mathbb{P}_a$ may be increased and $\mathbb{P}_d$ may be decreased so that the addition action can be chosen more than the deletion action. In another case when the current number of desirable positions in the teleport graph G is greater than the optimal number, then $\mathbb{P}_a$ may be decreased and $\mathbb{P}_d$ may be increased so that the deletion action can be chosen more than the addition action.

To efficiently limit the number of refinement operations, the refinement may utilize simulated annealing, such as a Boltzmann-like objective function as defined by:

$$f(G)=e^{-\frac{C(G)}{t}},$$

where f(G) is the objective function of the teleport graph G, C(G) is the total cost function, and t is a temperature parameter for the simulated annealing. When refinement operation is initiated, the temperature parameter is set to be high so that a possible teleport graph can be aggressively explored, and as the number of refinement operation is increased, the temperature parameter t is set to be low so that the deletion action of a desirable position can be performed more than the addition action.

Prior to refinement, the teleport graph is defined as G and during the refinement, the teleport graph is defined as G* so that teleport graphs are differentiated for explaining purposes below. In the same way, prior to refinement, the set of desirable positions is defined as V, and during the refinement, the set of desirable positions is defined as V*.

In a case where the addition action is performed, a navigational position pi, which is in P but not in V, is randomly added to the teleport graph G. It is noted that the addition changes a dimensionality of the teleport graph. Thus, in a case where the addition action of a navigational position results in a lower cost value, the added navigational position may become a desirable position of the teleport graph G*. It is formulated via an acceptance probability as defined by:

$$A_a(G^*|G)=\min\left(1,\frac{f(G^*)}{f(G)}\frac{\mathbb{P}_d}{\mathbb{P}_a}\frac{|P-V|}{|V^*|}\right),$$

where $A_a$ represents the probability for the addition action. The probability of $A_a$ is 1 or any number below 1. Only when the probability of $A_a$ is 1, the added navigational position becomes a desirable position and the teleport graph G* will be used for further refinement. Otherwise, the added navigational position is removed from the teleport graph G* and the original teleport graph G will be used for further refinement, if there is any. In an aspect, the reversible-jump Markov chain Monte Carlo technique (RJMCMC) may be employed in the addition action.

In a case where the deletion action is performed, a desirable position $p_i$, which is in the teleport graph G, is randomly deleted from the teleport graph G. It is noted that the deletion changes a dimensionality of the teleport graph. Thus, in a case where the deletion action of the desirable position $p_i$ results in a lower cost value, the deleted desirable position $p_i$ may remain deleted from the teleport graph G. It is formulated via a deletion probability as defined by:

$$A_d(G^* \mid G) = \min\left(1, \frac{f(G^*)}{f(G)} \frac{\mathbb{P}_a}{\mathbb{P}_d} \frac{|V|}{|P - V^*|}\right),$$

where $A_d$ represents the probability for the deletion action. The probability of $A_d$ is 1 or any number below 1. Only when the probability of $A_d$ is 1, the deleted desirable position $p_i$ remains deleted and the teleport graph G* will be used for further refinement. Otherwise, the deleted desirable position $p_i$ is added to the teleport graph G*, and the original teleport graph G will be used for further refinement, if there is any. In an aspect, the RJMCMC may be employed in the deletion action.

With respect to the movement action, a desirable position $p_i$ of the teleport graph G may be arbitrarily selected and moved within its neighborhood. For example, the desirable position $p_i$ is moved to $p_k$, where $p_k \in N(p_i)$. It is noted that the movement action does not change the dimensionality of the teleport graph G. In a case where the movement action of the desirable position $p_i$ to $p_k$ results in a lower cost value, the moved desirable position $p_k$ may become a new desirable position of the teleport graph G instead of the desirable position $p_i$. It is formulated via a movement probability as defined by:

$$A_m(G^* \mid G) = \min\left(1, \frac{f(G^*)}{f(G)}\right),$$

where $A_m$ represents the probability for the movement action. The probability of $A_m$ is 1 or any number below 1. Only when the probability of $A_m$ is 1, the moved desirable position $p_k$ becomes a new desirable position and the teleport graph G* will be used for further refinement. Otherwise, the original teleport graph G will be used for further refinement, if there is any. Since this is not a dimensionality-changing operation, the RJMCMC is not employed in the movement action.

After iteratively performing the refinement actions, the total cost C(G) is calculated and a difference ratio between two consecutive total costs is calculated. In a case where the difference ratio is less than or equal to a threshold value, the refinement action may be terminated because further refinement actions may not produce noticeable improvement. The threshold value may be 3%, 5%, 7%, or any user-defined value.

It is noted that the above-defined cost functions are provided as an example and not meant to be limiting. Other cost functions may be used without departing from the context of the cost categories (e.g., SP, connectivity, coverage, redundant coverage, regularization, danger, preference, etc.).

Figure 11:
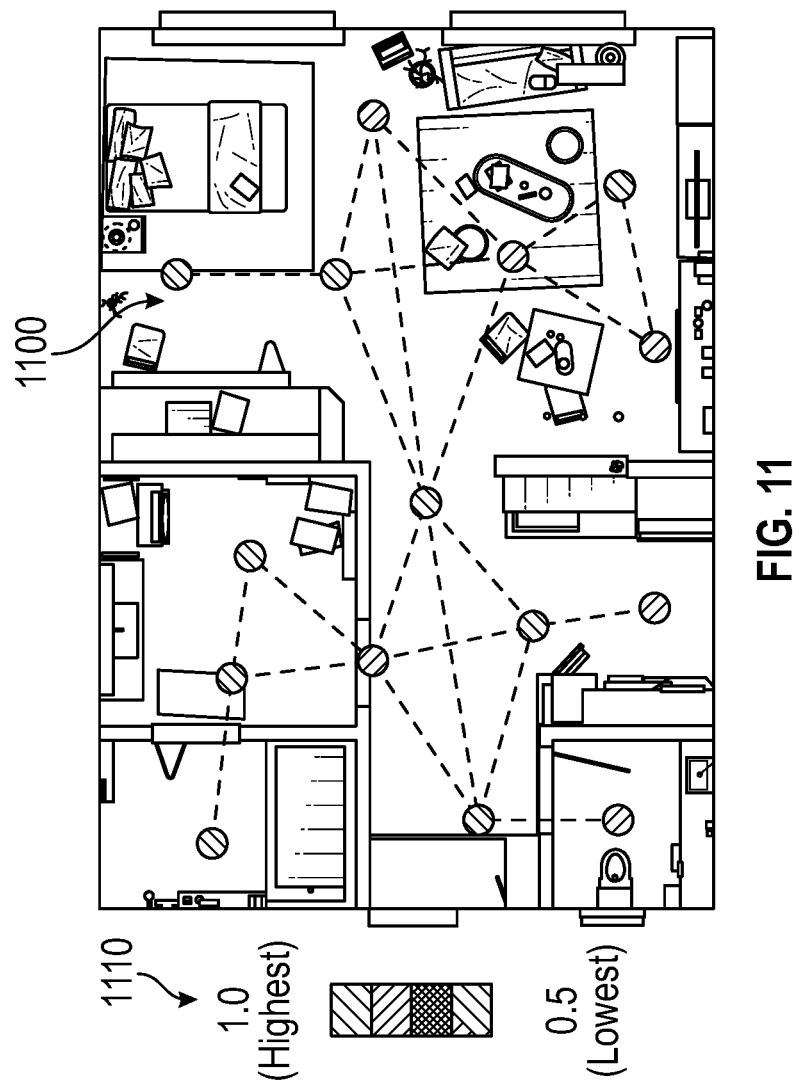
FIG. 11 is a graphical illustration of an optimum teleport graph with consideration of all costs in accordance with aspects of the present disclosure.
Figure 12:
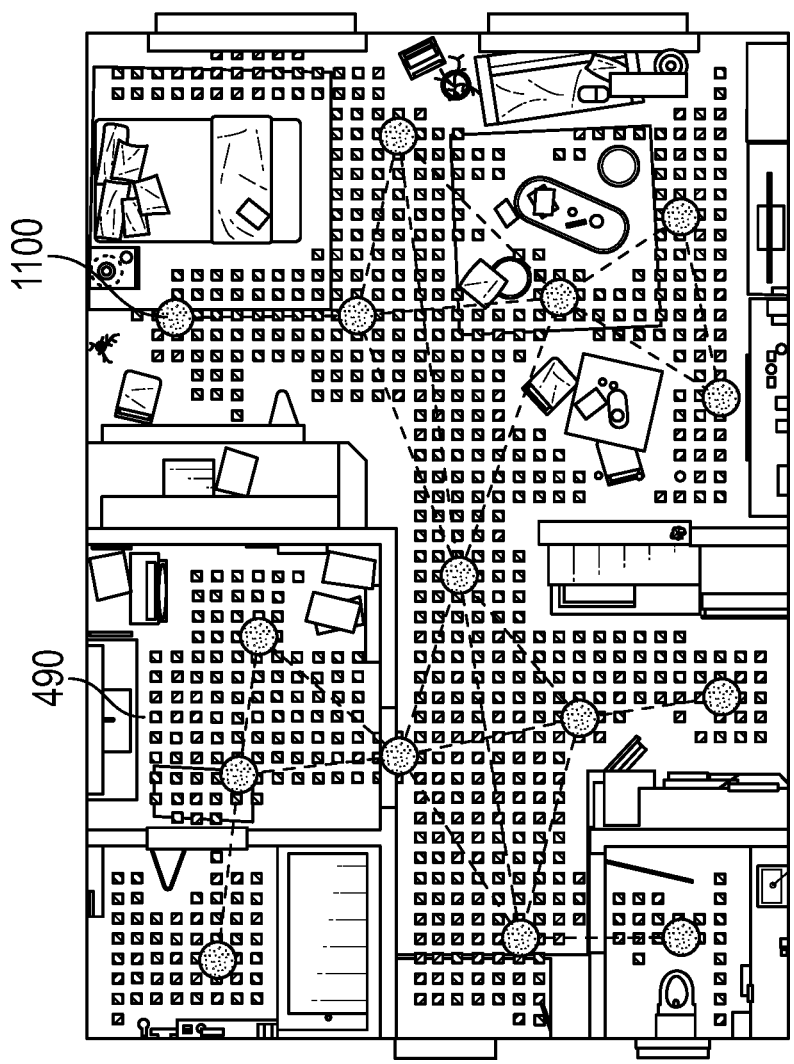
FIG. 12 is a graphical illustration of the optimum teleport graph of FIG. 11 over an SP map in accordance with aspects of the present disclosure.

After consideration of all the cost features, a refined teleport graph 1100 may be generated as shown in FIG. 11 according to aspects of the present disclosure, and FIG. 12 illustrates the optimum teleport graph 1100 of FIG. 11 over the SP map 490 of FIG. 4. An SP score indicator 1110 is also shown in FIG. 11. Based on the SP score indicator 1110, not all the desirable positions in the refined teleport graph 1100 have the highest SP score. Nevertheless, by following the desirable positions in the refined teleport graph 1100, a user may be able to efficaciously navigate or traverse the VR space without any space being unseen or unvisited. In an aspect, each desirable position may be assigned to a respective color or size based on user's preferences. For example, a desirable position, which is close to a preferred position (e.g., shoes store at a shopping mall, a master bedroom in a house, a favorite restaurant in a mall, etc.), may be colored with an eye-catching color (e.g., green, yellow, pink, florescent, etc.), which attracts user's attention, or have a greater size than others. Further, when a desirable position in the refined teleport graph 1100 is close to a dangerous object or environment, the desirable position may be colored with red color to bring user's attention. Sizes or colors for the desirable positions in the refined teleport graph 1100 may be differently assigned based on user's preferences. The application of colors and sizes in desirable positions is provided for examples and is not meant to be limited thereto. Rather, the application of colors and sizes may be determined based on user's preferences (e.g., red for status, green for paintings, blue for animal exhibition, etc.) and characteristics (e.g., green for safe place or residency, red for dangerous place, yellow for sports, florescent for amusements, etc.) of desirable positions. Both of shape and color may be used for desirable positions. For example, a red cross is for medical institutions, a red fire truck is for fire departments, a blue building is for educational institutions, an orange fork and knife is for restaurant, and the like. Thus, a user can pick a size, color, or combination of both to easily jump to a position, to which the user wants to go even without any knowledge of the place, thereby facilitating navigation of the place.

Figure 13A:
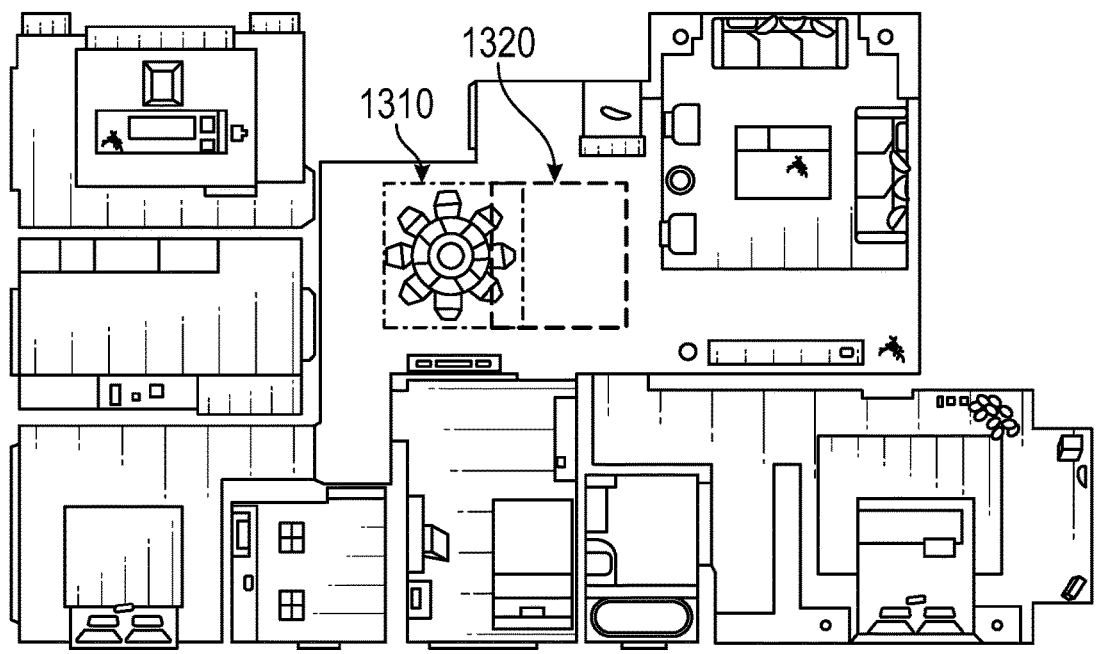
FIG. 13A shows when an object is moved in a graphical representation of a VR or real space in accordance with aspects of the present disclosure.
Figure 13B:
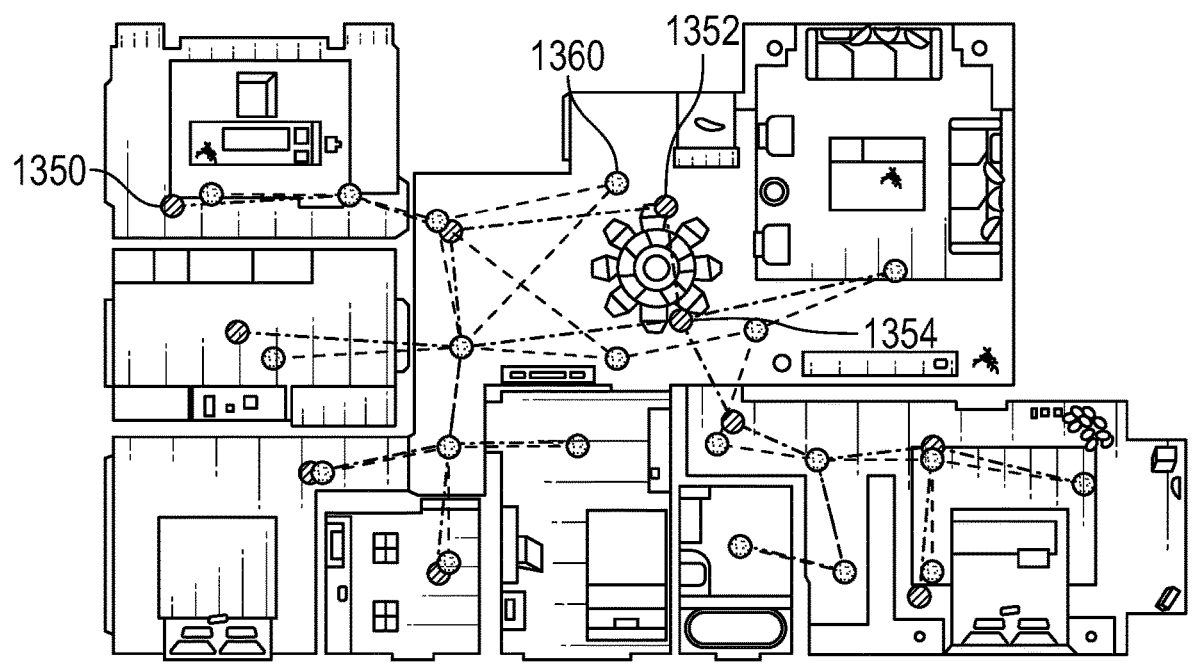
FIG. 13B shows changes in an optimum teleport graph when the object is moved in a VR or real space as in FIG. 13A in accordance with aspects of the present disclosure.

In a case where an optimal teleport graph G has been generated and an object, which has been previously identified, is moved within the VR or real space, a new teleport graph G* may be generated to compensate for the movement of the object. FIG. 13A illustrates a movement of an object in the VR space and FIG. 13B illustrates a change in the teleport graph based on the movement of the object according to aspects of the present disclosure.

As described above, free space for navigational positions occupies areas other than identified objects. Thus, when an object is moved, the free space changes, correspondingly. That results in different navigational positions. For example, when an object moves, a box 1310 surrounding the object also moves so that a box 1320 surrounding the moved object is formed. In this case, free space is to be updated by adding the area of the box 1310 and removing the area of the box 1320, and navigational positions are correspondingly updated. Further, panoramic views at the updated positions are generated so that SP scores at the updated positions can be calculated. After updating the SP map, refinement actions are performed. At this time, instead of starting anew for generating a new teleport graph, an original teleport graph 1350 may be used to generate a new teleport graph 1360.

In an aspect, instead of randomly performing the refinement actions, the deletion action may be performed with the highest priority. For example, two desirable positions 1352 and 1354 of the teleport graph 1350 are positioned over the box 1320. Thus, deletion of the desirable positions 1352 and 1354 from the teleport graph 1350 may be performed first or the probability $\mathbb{P}_d$ of the deletion action may be set to be comparatively higher than the probability $\mathbb{P}_a$ of the addition action. After deletion of the desirable positions 1352 and 1354 of the teleport graph 1350, the addition action may be performed and the probability $\mathbb{P}_d$ of the deletion action may be set to be equal to the probability $\mathbb{P}_a$ of the addition action.

In another aspect, navigational positions or desirable positions may not be selected randomly as described above. Rather, navigational positions or desirable positions, which are close to the area of the changes, may have a higher priority for the selection than those in other areas because the most changes between the teleport graphs 1350 and 1360 occur near the areas of changes and that slight changes are made in areas far away from the areas of changes. Thereby, the refined teleport graph 1360 may be obtained in a fast pace.

Figure 14A:
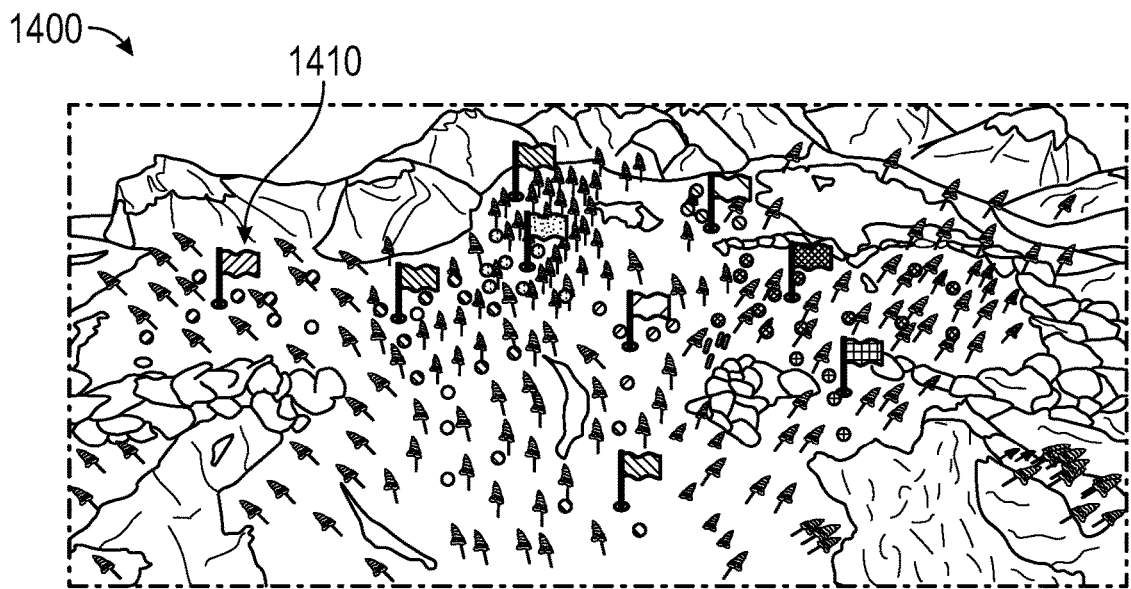
FIG. 14A shows a graphical illustration of an outdoor open area in accordance with aspects of the present disclosure.

FIG. 14 shows a graphical illustration of a mountain, real or virtual, as an example of an outdoor open area, according to the aspects of the present disclosure. While indoor spaces can be divided by rooms, outdoor open areas are not divided into distinct areas but rather a whole one space. Further, outdoor open areas may have dangerous or restricted areas, and there are not many reference panoramic images to be compared for calculation of SP scores in the outdoor open areas. That means SP scores need to be calculated in a way different from the calculations for the indoor areas. Furthermore, outdoor open areas tend to be larger in size than indoor areas. The outdoor open area may include a university, museum, exhibition, and the like, and the corresponding teleport graph may be for touring.

In consideration of the size, navigational points for the outdoor open area 1410 may be more coarsely determined than in indoor areas. In other words, the density of navigational points in the outdoor open area 1400 is much less than that in the indoor areas.

In consideration of calculation of SP scores, scenic viewpoints, visitor's center, restaurants, restrooms, or any other landmarks (collectively the "landmarks") may be used for SP score calculations. For example, the SP score may be calculated based on visibility of landmarks from navigational positions. User's preferred positions may also be included in the landmarks.

The free space may be determined in the outdoor open area 1400 by excluding the dangerous or restricted areas. After the free space is determined, navigational positions are allocated within the free space, and panoramic images are generated at the navigational positions. As described above, an SP score at each navigational position is calculated based on visibility of the landmarks. For example, if a user can see two landmarks at a navigational position, the SP score at the navigational position is two, and the likes. An SP map is generated after calculating SP scores for all navigational positions.

Figure 14B:
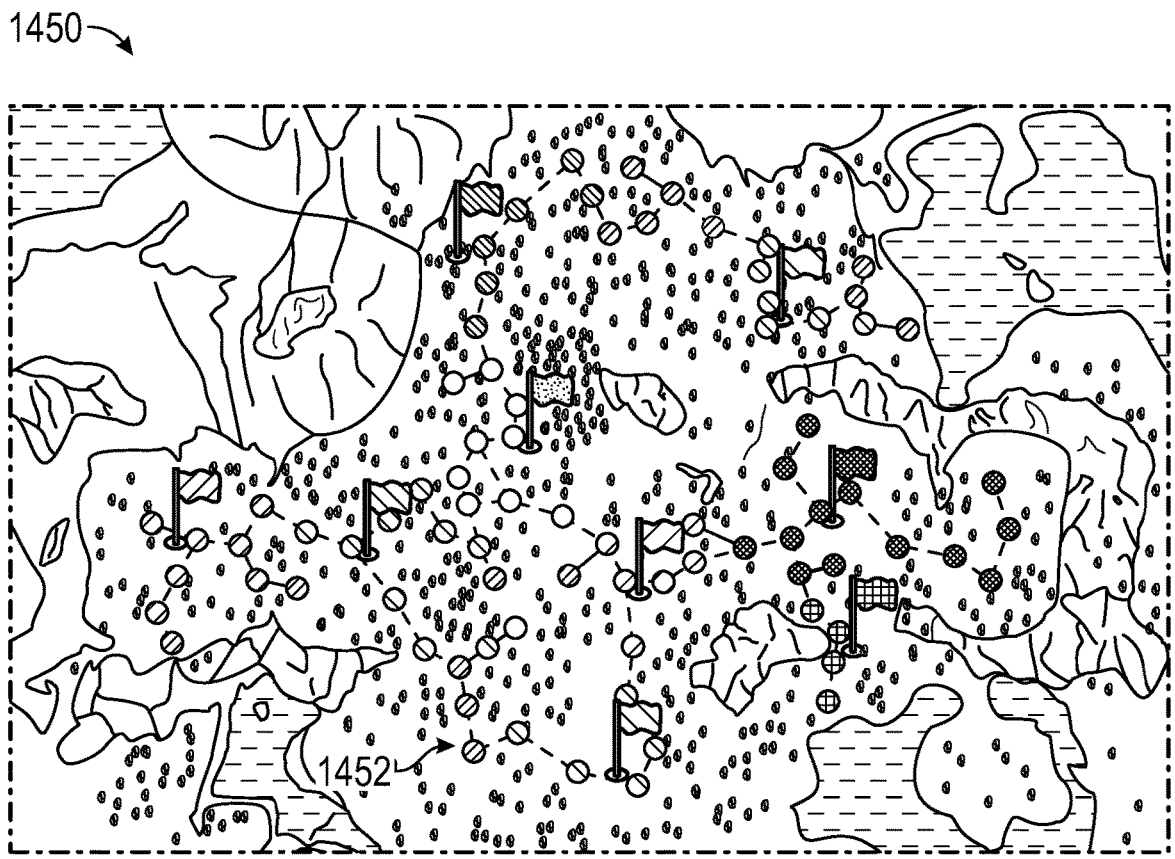
FIG. 14B illustrates applications of teleport graphs in the open outdoor space of FIG. 14A in accordance with aspects of the present disclosure.

After selecting navigational positions as desirable positions of a teleport graph, refinement actions are performed based on cost functions. Unlike the cost functions used in the indoor areas, the outdoor open area 1400 does not include a room and thus a weight for the room coverage cost function is zero. After determining convergence of the total costs, a refined teleport graph 1450 is made as shown in FIG. 14B.

The teleport graph 1450 includes several desirable positions, of which SP scores are zero. For example, a desirable position 1452 is one of them. Such desirable positions are added for connection purposes.

In an aspect, each landmark may be colored with its respective color and desirable positions near the landmark may be colored with the same color of the landmark. For example, in a case when the outdoor open area is a museum, a statue section may be colored with red, a painting section may be colored with green, a photograph section may be colored with yellow. color assignment may be based on user's preferences.

Figure 15:
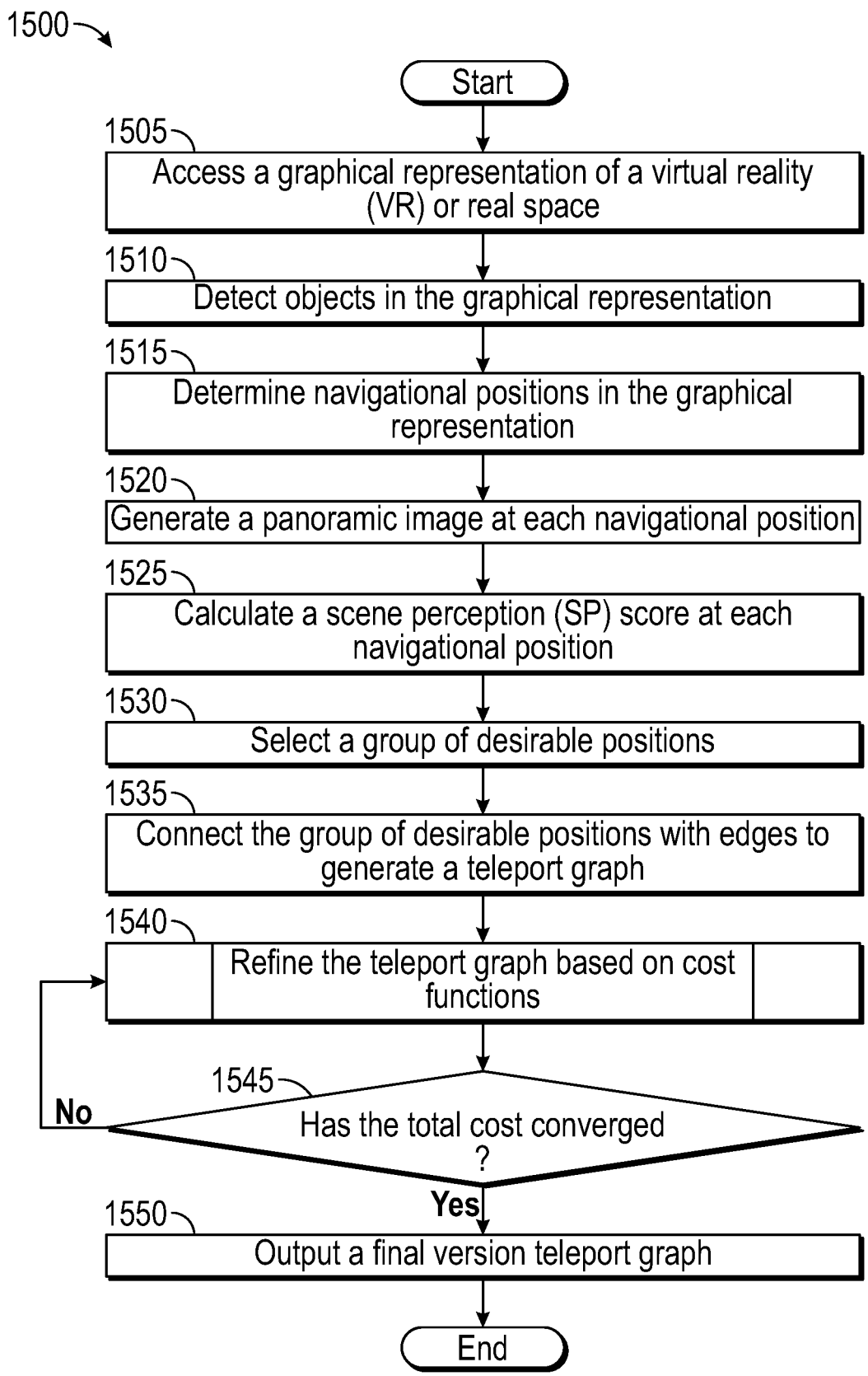
FIG. 15 is a flowchart for a method for generating a teleport graph in a VR space in accordance with aspects of the present disclosure.

FIG. 15 illustrates a flowchart for a method 1500 for generating a teleport graph to efficaciously navigate a VR or real space in accordance with aspects of the present disclosure. The teleport graph may provide desirable positions, at which users have desirable views, and edges connecting the positions, through which users are able to navigate the VR or real space (collectively "VR space"). The method 1500 starts by receiving a graphical representation of a VR space in step 1505. The graphical representation may be a three or two dimensional image. VR space itself is a graphical representation thereof, while a real space needs to be captured and digitized to provide a graphical representation.

In step 1510, objects in the graphical representation may be detected. The objects may be anything which is position on the floor to prevent users from navigating. For example, the objects may be TV, bed, table, cabinet, lights, window, chair, sink, bathtub, or the like. In an aspect, objects may be dangerous/prohibited/restricted areas.

In step 1515, navigational positions, which are candidates for desirable positions of the teleport graph, are determined in areas free or clear of the detected objects in the graphical representation of the VR or real space. Each navigational position may be determined based on a unit area. The shape of the unit area may be a square, circle, or any shape that can cover the free areas, and the size of the unit area may be predetermined based on the size of the VR or real space or a predetermined number of desirable positions of the teleport graph.

At each navigational position, a panoramic image is generated at step 1520. The panoramic image may be a 360 degree or fish-eye image at the navigational position. The panoramic image may be used to calculate desirability from the point of view of the user at step 1525. The desirability is a scene perception (SP) score. An SP map may be made after calculating an SP score at every navigational position.

In step 1530, a group of navigational positions is selected as desirable positions of the teleport graph. The selected navigational positions may have an SP score, which is greater than or equal to a predetermined threshold, thereby providing desirable views for users.

In step 1535, the group of navigational positions is combined with edges to generate a teleport graph. In other words, the teleport graph may include navigational positions and edges, of which each connects a pair of navigational positions. At this time, the teleport graph may have one or more isolated graphs (e.g., 710, 720, and 730 of FIG. 7). The edges provide users the ability to navigate the VR or real space and navigational positions provide users desirable views thereat.

Figure 16:
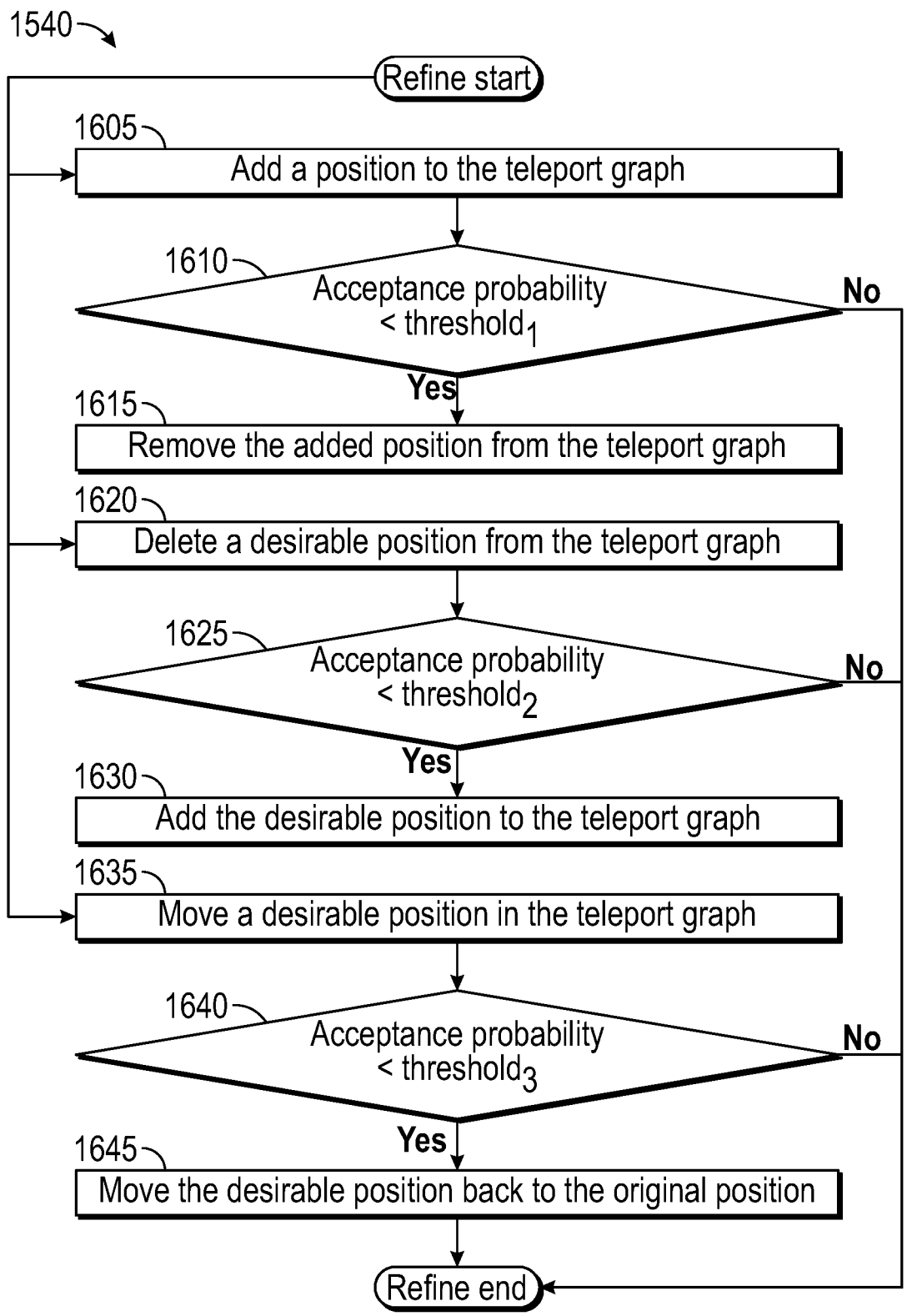
FIG. 16 is a flowchart for refining a teleport graph in a VR space in accordance with aspects of the present disclosure.

The teleport graph is refined based on cost functions in step 1540. Regarding the refinement, FIG. 16 shows how the refinement step 1540 of FIG. 15 is performed in accordance with aspects of the present disclosure. The refinement may include three actions: addition, deletion, and movement. These refinement actions may be randomly selected at each refinement. In an aspect, probability for each refinement action may be determined by a user's preference or based on situation. For example, if the number of desirable positions is smaller than an optimum number, the addition action may be set to be selected with a higher frequency than other actions, if the number is greater than the optimum number, the deletion action may be set to be selected with a higher frequency than other actions, and if the number is equal to the optimum number, the movement action may be set to be selected more than the other actions.

In a case when the addition action is selected for the refinement, the addition action adds a navigational position as a new desirable position to the teleport graph in step 1605. A new total cost is calculated based on the addition of the new desirable position. The new total cost is compared with the total cost of the original teleport graph before the addition to calculate an acceptance probability $$\left(\text{e.g., } A_a(G^* \mid G) = \min\left(1, \frac{f(G^*)}{f(G)} \frac{\mathbb{P}_d}{\mathbb{P}_a} \frac{|P - V|}{|V^*|}\right)\right).$$

In step 1610, the acceptance probability is compared with a first threshold. If it is determined that the acceptance probability is not less than the first threshold, the addition of the new desirable position is considered as improving the teleport graph. Thus, the new desirable position remains in the teleport graph. In an aspect, the first threshold may be "1".

In a case where it is determined that the acceptance probability is less than the first threshold, the addition of the new desirable position is considered not improving the teleport graph. Hence, the new desirable position is removed from the teleport graph in step 1615. The original teleport graph, which is prior to the addition, will be used for further refinement.

In a case where the deletion action is selected, a desirable position of the teleport graph may be randomly selected and deleted from the teleport graph in step 1620. A new total cost is calculated based on the deletion of the desirable position. The new total cost is compared with the total cost of the original teleport graph before the deletion to calculate an acceptance probability $$\left(\text{e.g., } A_d(G^* \mid G) = \min\left(1, \frac{f(G^*)}{f(G)} \frac{\mathbb{P}_a}{\mathbb{P}_d} \frac{|V|}{|P - V^*|}\right)\right).$$

In step 1625, the acceptance probability is compared with a second threshold. If it is determined that the acceptance probability is not less than the second threshold, the deletion of the desirable position is considered as improving the teleport graph. Thus, the teleport graph without the deleted desirable position will be used for further refinement. In an aspect, the second threshold may be "1".

In a case where it is determined that the acceptance probability is less than the second threshold, the deletion of the desirable position is considered not improving the teleport graph. Hence, the deleted desirable position is added back to the teleport graph in step 1630. The teleport graph, which is the same as the original teleport graph prior to the addition, will be used for further refinement.

In an aspect, since the addition and deletion actions change the dimensionality of the teleport graph, RJMCMC may be employed in the addition and deletion actions.

In a case where the movement action is selected, a desirable position of the teleport graph is randomly selected and moved to a navigational position in the neighborhood of the desirable position in step 1635. A new total cost is calculated based on the movement of the desirable position. The new total cost is compared with the total cost of the original teleport graph before the movement to calculate an acceptance probability $$\left(\text{e.g., } A_m(G^* \mid G) = \min\left(1, \frac{f(G^*)}{f(G)}\right)\right).$$

In an aspect, the third threshold may be "1".

In step 1640, the acceptance probability is compared with a third threshold. If it is determined that the acceptance probability is not less than the third threshold, the movement of the desirable position is considered as improving the teleport graph. Thus, the teleport graph with the moved desirable position will be used for further refinement.

In a case where it is determined that the acceptance probability is less than the third threshold, the movement of the desirable position is considered not improving the teleport graph. Hence, the moved desirable position is moved back to its original position in step 1645. The teleport graph, which is the same as the original teleport graph prior to the movement, will be used for further refinement.

Now referring back to the cost function of step 1540 of FIG. 15, the cost functions may include an SP score cost function, a coverage cost function, a redundant coverage cost function, a connectivity cost function, a regularization cost function, a danger cost function, and a preference cost function. The SP score cost function provides a cost value based on the sum of all SP scores of the desirable positions in the teleport graph. The coverage cost function may include an area coverage cost function related to areas covered by the desirable positions in the free areas and a room coverage cost function related to rooms covered by the desirable positions compared to all rooms in the VR or real space. The redundant coverage cost function provides a value indicative of overlapped areas, as shown in FIG. 10, by neighborhoods of the desirable positions.

The connectivity cost function is based on a number of isolated graphs in the teleport graph. If there are two or more isolated graphs, that means users cannot efficaciously navigate the VR or real space because navigation is possible only through edges and there is no edge between two isolated graphs.

The regularization cost function is related to a number of desirable positions in the teleport graph based on an optimum number, which is predetermined based on the size of the VR or real space. In an aspect, the optimum number may be determined by a machine learning algorithm, which has been trained with VR spaces and human-marked desirable positions to find a polynomial function $\lambda(|P|)$, which outputs an optimum number when the total number of navigational positions is input.

The danger cost function provides a value indicating how far or close the desirable positions are from the dangerous objects or environment, and the preference cost function provides a value indicating how close the desirable positions are from user's preferred objects or environment.

By summing all the cost values, the total cost is calculated. In step 1545, it is determined whether or not the total cost has converged. Convergence of the total cost may be determined by calculating a percent change between two consecutive total changes. In a case when the percent change is less than or equal to a threshold (e.g., 7%, 5%, or 3%), it is considered that the total cost has converged. Then, the current teleport graph is output as the final version teleport graph in step 1550.

In a case where it is determined that the percent change is greater than the threshold value, refinement is performed again until the percent change is less than or equal to the threshold.

Figure 17:
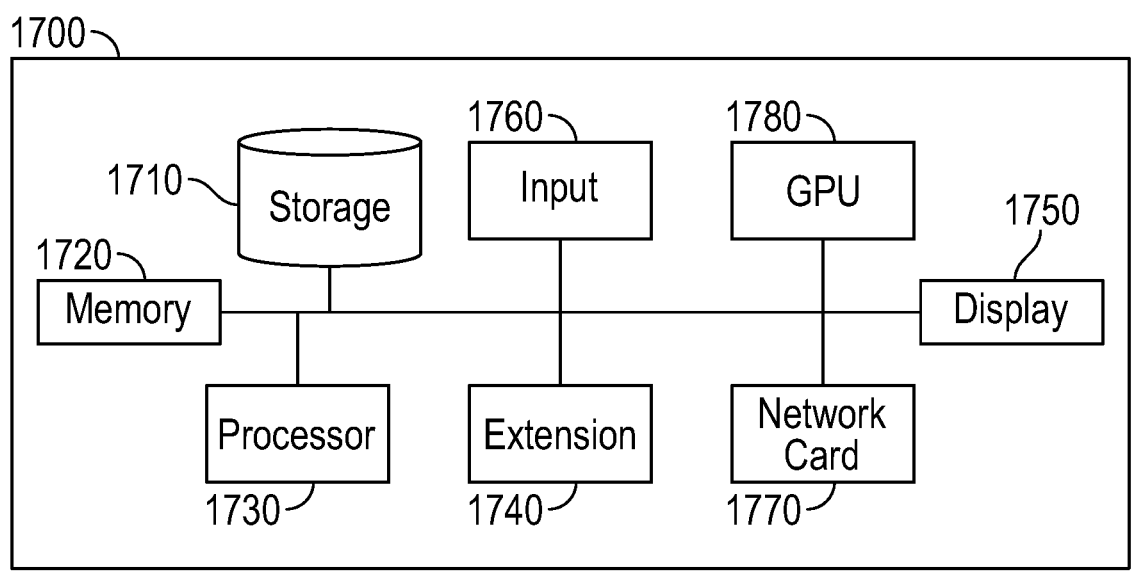
FIG. 17 is a block diagram of a computing device in accordance with aspects of the present disclosure.

FIG. 17 is a block diagram for a computing device 1700 representative of the computing device, which generates an optimum teleport graph in accordance with aspects of the present disclosure. The computing device 1700 may include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, embedded computers, cloud servers, and the likes. Those of skill in the art will recognize that many smartphones are suitable for use in the system described herein. Suitable tablet computers include those with booklet, slate, and convertible configurations, known to those of skill in the art.

In some aspects, the computing device 1700 includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some aspects, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some aspects, the computing device 1700 may include a storage 1710. The storage 1710 is one or more physical apparatus used to store data or programs on a temporary or permanent basis. In some aspects, the storage 1710 may be volatile memory and requires power to maintain stored information. In some aspects, the storage 1710 may be non-volatile memory and retains stored information when the computing device 1700 is not powered. In some aspects, the non-volatile memory includes flash memory. In some aspects, the non-volatile memory includes dynamic random-access memory (DRAM). In some aspects, the non-volatile memory includes ferroelectric random-access memory (FRAM). In some aspects, the non-volatile memory includes phase-change random access memory (PRAM). In some aspects, the storage 1710 includes, by way of non-limiting examples, CD-ROMs, DVDs, flash memory devices, magnetic disk drives, magnetic tapes drives, optical disk drives, and cloud-based storage. In some aspects, the storage 1710 may be a combination of devices such as those disclosed herein.

The computing device 1700 further includes a processor 1730, an extension 1740, a display 1750, an input device 1760, and a network card 1770. The processor 1730 is a brain to the computing device 1700. The processor 1730 executes instructions which implement tasks or functions of programs. When a user executes a program, the processor 1730 reads the program stored in the storage 1710, loads the program on the RAM, and executes instructions prescribed by the program.

The processor 1730 may include a microprocessor, central processing unit (CPU), application specific integrated circuit (ASIC), arithmetic coprocessor, or image processor, each of which is electronic circuitry within a computer that carries out instructions of a computer program by performing the basic arithmetic, logical, control and input/output (I/O) operations specified by the instructions.

In aspects, the extension 1740 may include several ports, such as one or more universal serial buses (USBs), IEEE 1394 ports, parallel ports, and/or expansion slots such as peripheral component interconnect (PCI) and PCI express (PCIe). The extension 1740 is not limited to the list but may include other slots or ports that can be used for appropriate purposes. The extension 1740 may be used to install hardware or add additional functionalities to a computer that may facilitate the purposes of the computer. For example, a USB port can be used for adding additional storage to the computer and/or an IEEE 1394 may be used for receiving moving/still image data.

In some aspects, the display 1750 may be a cathode ray tube (CRT), a liquid crystal display (LCD), or light emitting diode (LED). In some aspects, the display 1750 may be a thin film transistor liquid crystal display (TFT-LCD). In some aspects, the display 1750 may be an organic light emitting diode (OLED) display. In various some aspects, the OLED display is a passive-matrix OLED (PMOLED) or active-matrix OLED (AMOLED) display. In some aspects, the display 1750 may be a plasma display. In some aspects, the display 1750 may be a video projector. In some aspects, the display may be interactive (e.g., having a touch screen or a sensor such as a camera, a 3D sensor, a LiDAR, a radar, etc.) that can detect user interactions/gestures/responses and the like.

In still some aspects, the display 1750 is a combination of devices such as those disclosed herein.

A user may input and/or modify data via the input device 1760 that may include a keyboard, a mouse, or any other device with which the use may input data. The display 1750 displays data on a screen of the display 1750. The display 1750 may be a touch screen so that the display 1750 can be used as an input device.

The network card 1770 is used to communicate with other computing devices, wirelessly or via a wired connection. Through the network card 1770, VR space may be received, accessed, and updated, and/or updated VR navigation data may be communicated from and to a VR server and user VR devices.

The computing device 1700 may further include a graphics processing unit (GPU) 1780, which generally accelerate graphics rendering. However, since the GPU 1780 is able to parallelly process many pieces of data simultaneously, the GPU 1780 may be used for machine learning systems and algorithms. The GPU 1780 may cooperate with the CPU 1730 to enhance navigational computations in a VR or real space to generate an optimal teleport graph, thereby providing a smooth and easy teleport transportation for VR users.

Any of the herein described methods, programs, algorithms, or codes may be converted to, or expressed in, a programming language or computer program. The terms "programming language" and "computer program," as used herein, include any language used to specify instructions to a computer, and include (but not limited to) the following languages and their derivatives: Assembler, Basic, Batch files, BCPL, C, C+, C++, C #, Delphi, Fortran, Java, JavaScript, machine code, operating system command languages, Pascal, Perl, PL1, scripting languages, Visual Basic, meta-languages which themselves specify programs, and all first, second, third, fourth, fifth, or further generation computer languages. Also included are database, other data schemas, and any other meta-languages. No distinction is made between languages which are interpreted or compiled. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), GPUs, or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, VR-related devices.

What is claimed is:

1. A navigation system for facilitating navigation in a space, the navigation system comprising:
    a network interface configured to access a representation of a space;
    a memory storing instructions; and
    at least one processor coupled with the memory and executing the instructions to:
        detect objects in the representation of the space;
        determine a plurality of navigation positions which facilitate navigation in the representation of the space based on the detected objects;
        determine a plurality of navigational positions in the representation of the space;
        render a panoramic image from at least one of the plurality of navigational positions; and
        calculate a scene perception (SP) score at the at least one of the plurality of navigational positions based on a generated panoramic image,
    wherein the plurality of navigation positions is determined by:
        selecting a group of navigation positions, of which the SP scores are greater than a predetermined threshold, from among the plurality of navigational positions; and
        generating a teleport graph by connecting the group of navigation positions with edges.

2. The navigation system according to claim 1, wherein the space is a virtual, augmented, mixed reality or real space.

3. The navigation system according to claim 1, wherein the plurality of navigational positions is determined in a free space, which is free or clear of the detected objects in the representation of the space.

4. The navigation system according to claim 1, wherein the plurality of navigational positions is determined based on a unit area, wherein the unit area is based on a free space, which is free or clear of the objects in the representation of the space, and a predetermined neighboring area from at least one of the plurality of navigational positions.

5. The navigation system according to claim 1, wherein the SP score at the at least one of the plurality of navigational positions is based on visually desirable views.

6. The navigation system according to claim 1, wherein the panoramic image is an observer's first person view at the at least one of the plurality of navigational positions.

7. The navigation system according to claim 1, wherein the teleport graph includes the group of navigation positions and edges connecting at least one navigation position of the group of navigation positions to another desirable position of the group of navigation positions.

8. The navigation system according to claim 7, wherein the plurality of navigation positions of the teleport graph are connected via edges.

9. The navigation system according to claim 7, wherein the at least one processor executes the instructions further to:
    refine the teleport graph based on cost functions;
    repeat generation of the group of navigation positions, connecting the group of the navigation positions, and refinement of the teleport graph until a change in a total cost of the teleport graph converges; and
    output a final version teleport graph after convergence of the total cost.

10. The navigation system according to claim 9, wherein refinement is performed by the at least one processor by:
    adding a position, which is in the plurality of navigational positions but not in the teleport graph, to the teleport graph;
    deleting a navigation position of the plurality of navigation positions of the teleport graph; or
    moving a position of one navigation position of the plurality of navigation positions of the teleport graph to a position within a neighborhood of the plurality of navigation positions.

11. The navigation system according to claim 1, wherein the at least one processor executes the instructions further to:
    generate a reference panoramic view based on:
        determining a metric based on evaluating how similar a new view at a given position is to a plurality of human marked positions;

providing the metric as an input into a machine learning model that predicts similarities;

assigning a scene perception score based on the predicted similarities; and generating the reference panoramic view based on the assigned scene perception score.

12. The navigation system according to claim 1, wherein the scene perception (SP) score is calculated by a machine learning network.

13. A method for facilitating navigation in a space, the method comprising accessing a representation of a space;

detecting objects in the representation of the space;

determining a plurality of navigation positions, which facilitate navigation in the representation of the space based on the detected objects;

determining a plurality of navigational positions in the representation of the space;

generating a panoramic image from at least one of the plurality of navigational positions;

calculating a scene perception (SP) score at the at least one of the plurality of navigational positions based on a generated panoramic image; and generating a reference panoramic view based on:

determining a metric based on evaluating how similar a new view at a given position is to a plurality of human marked positions;

providing the metric as an input into a machine learning model that predicts similarities;

assigning a scene perception score based on the predicted similarities; and generating the reference panoramic view based on the assigned scene perception score.

14. The method according to claim 13, wherein the plurality of navigation positions is determined by selecting a group of navigation positions, of which the SP scores are greater than a predetermined threshold, from among the plurality of navigational positions; and generating a teleport graph by connecting the group of navigation positions with edges.

15. The method according to claim 14, further comprising:

refining the teleport graph based on cost functions;

repeating generation of the group of navigation positions, connecting the group of the navigation positions, and refinement of the teleport graph until a change in a total cost of the teleport graph converges; and outputting a final version teleport graph after convergence of the total cost.

16. The method according to claim 15, wherein refinement is performed by:

adding a position, which is in the plurality of navigational positions but not in the teleport graph, to the teleport graph;

deleting a navigation position in the teleport graph; or moving a position of one navigation position in the teleport graph to a position within a neighborhood of the position.

17. A non-transitory computer-readable medium storing instructions that, when executed by a computer, cause the computer to perform a method for facilitating navigation in a space, the method comprising:

accessing a representation of a space;

detecting objects in the representation of the space;

determining a plurality of navigation positions, which facilitate navigation in the representation of the space based on the detected objects;

determining a plurality of navigational positions in the representation of the space;

generating a panoramic image from at least one of the plurality of navigational positions;

calculating a scene perception (SP) score at the at least one of the plurality of navigational positions based on a generated panoramic image; and generating a reference panoramic view based on:

determining a metric based on evaluating how similar a new view at a given position is to a plurality of human marked positions;

providing the metric as an input into a machine learning model that predicts similarities;

assigning a scene perception score based on the predicted similarities; and generating the reference panoramic view based on the assigned scene perception score.

* * * * *